United States Patent
Tada et al.

(10) Patent No.: US 11,516,720 B2
(45) Date of Patent: Nov. 29, 2022

(54) RADIO BASE STATION, RADIO TERMINAL, RADIO COMMUNICATION SYSTEM, AND DATA TRANSMISSION METHOD

(71) Applicant: FUJITSU LIMITED, Kawasaki (JP)

(72) Inventors: Hiroshi Tada, Kawasaki (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 124 days.

(21) Appl. No.: 17/025,865

(22) Filed: Sep. 18, 2020

(65) Prior Publication Data
US 2021/0007033 A1    Jan. 7, 2021

Related U.S. Application Data

(63) Continuation of application No. PCT/JP2018/013929, filed on Mar. 30, 2018.

(51) Int. Cl.
| | |
|---|---|
| *H04W 4/00* | (2018.01) |
| *H04W 36/30* | (2009.01) |
| *H04W 36/06* | (2009.01) |
| *H04W 36/20* | (2009.01) |
| *H04W 40/12* | (2009.01) |
| *H04W 72/04* | (2009.01) |

(52) U.S. Cl.
CPC .......... *H04W 36/30* (2013.01); *H04W 36/06* (2013.01); *H04W 36/20* (2013.01); *H04W 40/12* (2013.01); *H04W 72/0453* (2013.01)

(58) Field of Classification Search
CPC ......... H04W 72/0446; H04W 72/1289; H04W 72/042; H04W 52/325; H04W 72/048; H04L 27/3488; H04L 5/0037

USPC ................. 370/328, 329, 330, 331
See application file for complete search history.

(56) References Cited

U.S. PATENT DOCUMENTS

| | | | | |
|---|---|---|---|---|
| 4,837,801 | A * | 6/1989 | Shimura .............. | H04B 7/2621 455/462 |
| 11,223,931 | B2 * | 1/2022 | Yamamoto ......... | H04B 7/15542 |

(Continued)

FOREIGN PATENT DOCUMENTS

| | | | | |
|---|---|---|---|---|
| DE | 69831358 | T2 * | 3/2006 | ............ H04W 36/12 |
| EP | 1473957 | A1 * | 11/2004 | ............ H04W 72/02 |

(Continued)

OTHER PUBLICATIONS

International Search Report and Written Opinion of the International Searching Authority issued by the Japan Patent Office for corresponding International Patent Application No. PCT/JP2018/013929, dated Jun. 19, 2018, with an English translation.

(Continued)

*Primary Examiner* — David Q Nguyen
(74) *Attorney, Agent, or Firm* — Myers Wolin, LLC

(57) ABSTRACT

A radio base station that controls radio communication with a radio terminal using a first radio frequency includes: a controller that controls a period in which the radio terminal enables to measure a second radio frequency different from the first radio frequency; a transmitter that transmits a control signal including information regarding the second radio frequency and the period to the radio terminal; and a transfer unit that transfers data addressed to the radio terminal in a case where the data occurs during the period.

15 Claims, 12 Drawing Sheets

(56) References Cited

U.S. PATENT DOCUMENTS

| | | | |
|---|---|---|---|
| 11,265,829 B2* | 3/2022 | Chou | H04W 76/27 |
| 2004/0218560 A1* | 11/2004 | Bonald | H04W 72/02 370/321 |
| 2017/0013623 A1 | 1/2017 | Chin et al. | |
| 2018/0255472 A1* | 9/2018 | Chendamarai Kannan | H04W 76/10 |

FOREIGN PATENT DOCUMENTS

| | | | | |
|---|---|---|---|---|
| JP | 2007266990 A | * | 10/2007 | H04W 36/30 |
| WO | 2015/115263 A1 | | 8/2015 | |

OTHER PUBLICATIONS

Huawei et al., "Discussion on Multi-TRP cooperation for URLLC", Agenda Item: 5.1.3.3.8, 3GPP TSG-RAN WG1 NR Ad Hoc Meeting, R1-1710468, Qingdao, China, Jun. 27-30, 2017.

Ericsson, "Faster measurements and signaling for Ultra reliable mobility", Agenda Item: 10.3.1.1.5, 3GPP TSG-RAN WG2 Meeting #97, R2-1700921, Athens, Greece, Feb. 13-17, 2017.

Fujitsu et al., "Discussion on Data Forwarding for Dual Connectivity", Agenda Item: 7.2.2, 3GPP TSG-RAN WG2 Meeting #85, R2-140219, Prague, Czech Republic, Feb. 10-14, 2014.

3GPP TS 36.211 V15.0.0, "3rd Generation Partnership Project; Technical Specification Group Radio Access Network; Evolved Universal Terrestrial Radio Access (E-UTRA); Physical channels and modulation (Release 15)", Dec. 2017.

3GPP TS 36.212 V15.0.1, "3rd Generation Partnership Project; Technical Specification Group Radio Access Network; Evolved Universal Terrestrial Radio Access (E-UTRA); Multiplexing and channel coding (Release 15)", Jan. 2018.

3GPP TS 36.213 V15.0.0, "3rd Generation Partnership Project; Technical Specification Group Radio Access Network; Evolved Universal Terrestrial Radio Access (E-UTRA); Physical layer procedures (Release 15)", Dec. 2017.

3GPP TS 36.300 V15.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2017.

3GPP TS 36.321 V15.0.0, "3rd Generation Partnership Project; Technical Specification Group Radio Access Network; Evolved Universal Terrestrial Radio Access (E-UTRA); Medium Access Control (MAC) protocol specification (Release 15)", Dec. 2017.

3GPP TS 36.322 V15.0.0, "3rd Generation Partnership Project; Technical Specification Group Radio Access Network; Evolved Universal Terrestrial Radio Access (E-UTRA); Radio Link Control (RLC) protocol specification (Release 15)", Dec. 2017.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification (Release 15)", Jan. 2018.

3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2017.

3GPP TS 36.423 V15.0.0, "3rd Generation Partnership Project; Technical Specification Group Radio Access Network; Evolved Universal Terrestrial Radio Access Network (E-UTRAN); X2 application protocol (X2AP) (Release 15)", Dec. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TS 37.340 V15.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.0.0, "3rd Generation Partnership Project; Technical Specification Group Radio Access Network; NR; Services provided by the physical layer (Release 15)", Dec. 2017.

3GPP TS 38.211 V15.0.0, "3rd Generation Partnership Project; Technical Specification Group Radio Access Network; NR; Physical channels and modulation (Release 15)", Dec. 2017.

3GPP TS 38.212 V15.0.0, "3rd Generation Partnership Project; Technical Specification Group Radio Access Network; NR; Multiplexing and channel coding (Release 15)", Dec. 2017.

3GPP TS 38.213 V15.0.0, "3rd Generation Partnership Project; Technical Specification Group Radio Access Network; NR; Physical layer procedures for control (Release 15)", Dec. 2017.

3GPP TS 38.214 V15.0.0, "3rd Generation Partnership Project; Technical Specification Group Radio Access Network; NR; Physical layer procedures for data (Release 15)", Dec. 2017.

3GPP TS 38.215 V15.0.0, "3rd Generation Partnership Project; Technical Specification Group Radio Access Network; NR; Physical layer measurements (Release 15)", Dec. 2017.

3GPP TS 38.300 V15.0.0, "3rd Generation Partnership Project; Technical Specification Group Radio Access Network; NR; NR and NG-RAN Overall Description; Stage 2 (Release 15)", Dec. 2017.

3GPP TS 38.321 V15.0.0, "3rd Generation Partnership Project; Technical Specification Group Radio Access Network; NR; Medium Access Control (MAC) protocol specification (Release 15)", Dec. 2017.

3GPP TS 38.322 V15.0.0, "3rd Generation Partnership Project; Technical Specification Group Radio Access Network; NR; Radio Link Control (RLC) protocol specification (Release 15)", Dec. 2017.

3GPP TS 38.323 V15.0.0, "3rd Generation Partnership Project; Technical Specification Group Radio Access Network; NR; Packet Data Convergence Protocol (PDCP) specification (Release 15)", Dec. 2017.

3GPP TS 38.331 V15.0.0, "3rd Generation Partnership Project; Technical Specification Group Radio Access Network; NR Radio Resource Control (RRC) protocol specification (Release 15)", Dec. 2017.

3GPP TS 38.401 V15.0.0, "3rd Generation Partnership Project; Technical Specification Group Radio Access Network; NG-RAN; Architecture description (Release 15)", Dec. 2017.

3GPP TS 38.410 V0.6.0, "3rd Generation Partnership Project; Technical Specification Group Radio Access Network; NG-RAN; NG general aspect and principles (Release 15)", Dec. 2017.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017.

3GPP TS 38.420 V0.5.0, "3rd Generation Partnership Project; Technical Specification Group Radio Access Network; NG-RAN; Xn general aspects and principles (Release 15)", Dec. 2017.

3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017.

3GPP TS 38.470 V15.0.0, "3rd Generation Partnership Project; Technical Specification Group Radio Access Network; NG-RAN; F1 general aspects and principles (Release 15)", Jan. 2018.

3GPP TS 38.473 V15.0.0, "3rd Generation Partnership Project; Technical Specification Group Radio Access Network; NG-RAN; F1 application protocol (F1AP) (Release 15)", Dec. 2017.

3GPP TR 38.801 V14.0.0, "3rd Generation Partnership Project; Technical Specification Group Radio Access Network; Study on new radio access technology: Radio access architecture and interfaces (Release 14)", Mar. 2017.

(56) References Cited

OTHER PUBLICATIONS

3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)," Jul. 2017.
3GPP TR 38.912 V14.1.0, "3rd Generation Partnership Project; Technical Specification Group Radio Access Network; Study on New Radio (NR) access technology (Release 14)," Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.

\* cited by examiner

RADIO BASE STATION, RADIO TERMINAL, RADIO COMMUNICATION SYSTEM, AND DATA TRANSMISSION METHOD

CROSS-REFERENCE TO RELATED APPLICATION

This application is a continuation of International Application No. PCT/JP2018/013929, filed on Mar. 30, 2018, the entire contents of which are incorporated herein by reference.

FIELD

The embodiment discussed herein is related to a radio base station, a radio terminal, a radio communication system, and a data transmission method.

BACKGROUND

In the current network, the traffic of mobile terminals (smartphones and feature phones) accounts for most of the network resources. Furthermore, the traffic used by mobile terminals is expected to expand in the future.

On the other hand, in accordance with the development of Internet of things (IoT) services (for example, traffic systems and monitoring systems such as smart meters or device monitoring), there is a growing demand for technologies to support services having various requirements. Therefore, the communication standard of the fifth generation (5G) or New Radio (NR) mobile communication demands technologies for achieving higher data rate, larger capacity, and lower latency in addition to the standard technology of fourth generation (4G) mobile communication (for example, Non Patent Documents 1 to 11). Regarding the fifth-generation communication standard, technical studies are underway in working groups of 3GPP (for example, TSG-RAN WG1, and TSG-RAN WG2) (Non Patent Documents 12 to 33).

As described above, in order to support diversification of services, 5G assumes supporting a wide variety of use cases that can be classified into Enhanced Mobile BroadBand (eMBB), Massive Machine Type Communications (MTC) and Ultra-Reliable and Low Latency Communication (URLLC).

Of these, URLLC is the most difficult use case to implement. First, there is a demand for URLLC to ensure an ultra-high reliability that achieves the error rate in the radio section is on the order of $10^{-5}$. One method to ensure ultra-high reliability is to increase the amount of use resource to allow data redundancy. However, due to the limited radio resource, increasing the use resource indefinitely would not foe practical.

Second, URLLC is targeted to reduce user plane latency in the radio section to 0.5 ms or less over the uplink and downlink. This is a stringent demand for the latency of less than $\frac{1}{10}$ of that of a 4G radio system (Long Term Evolution: LTE). In this manner, URLLC needs to meet the two demands of ultra-high reliability and low latency at the same time.

Meanwhile, it is considered to use a carrier with a wide frequency bandwidth for 5G radio communication including URLLC. Therefore, the entire bandwidth used for radio communication may be wider than a receiving bandwidth that the radio terminal can receive, and thus, the radio terminal might receive a signal by switching the reception bandwidth for each of cells, for example. In such a case, when the handover of a radio terminal is performed, the radio terminal needs to switch the communication frequency in order to measure the radio quality of the cell of the handover destination.

Therefore, in a case where degradation occurs in the radio quality of the connecting cell for the radio terminal, the radio base station of the connecting cell sets a gap section during which communication in the connecting cell is interrupted. The radio base station then causes the radio terminal to perform communication frequency changeover during the gap section to measure the radio quality of neighboring cells.

Non Patent Document 1: 3GPP TS 36.211 V15.0.0 (2017 December)
Non Patent Document 2: 3GPP TS 36.212 V15.0.1 (2018 January)
Non Patent Document 3: 3GPP TS 36.213 V15.0.0 (2017 December)
Non Patent Document 4: 3GPP TS 36.300 V15.0.0 (2017 December)
Non Patent Document 5: 3GPP TS 36.321 V15.0.0 (2017 December)
Non Patent Document 6: 3GPP TS 36.322 V15.0.0 (2017 December)
Non Patent Document 7: 3GPP TS 36.323 V14.5.0 (2017 December)
Non Patent Document 8: 3GPP TS 36.331 V15.0.1 (2016 January)
Non Patent Document 9: 3GPP TS 36.413 V15.0.0 (2017 December)
Non Patent Document 10: 3GPP TS 36.423 V15.0.0 (2017 December)
Non Patent Document 11: 3GPP TS 36.425 V14.0.0 (2017 March)
Non Patent Document 12: 3GPP TS 37.340 V15.0.0 (2017 December)
Non Patent Document 13: 3GPP TS 38.201 V15.0.0 (2017 December)
Non Patent Document 14: 3GPP TS 38.202 V15.0.0 (2017 December)
Non Patent Document 15: 3GPP TS 38.211 V15.0.0. (2017 December)
Non Patent Document 16: 3GPP TS 38.212 V15.0.0 (2017 December)
Non Patent Document 17: 3GPP TS 38.213 V15.0.0 (2017 December)
Non Patent Document 18: 3GPP TS 38.214 V15.0.0. (2017 December)
Non Patent Document 19: 3GPP TS 38.215 V15.0.0 (2017 December)
Non Patent Document 20: 3GPP TS 38.300 V15.0.0 (2017 December)
Non Patent Document 21: 3GPP TS 38.321 V15.0.0 (2017 December)
Non Patent Document 22: 3GPP TS 38.322 V15.0.0 (2017 December)
Non Patent Document 23: 3GPP TS 38.323 V15.0.0 (2017 December)
Non Patent Document 24: 3GPP TS 38.331 V15.0.0 (2017 December)
Non Patent Document 25: 3GPP TS 38.401 V15.0.0 (2017 December)
Non Patent Document 26: 3GPP TS 38.410 V0.6.0 (2017 December)
Non Patent Document 27: 3GPP TS 38.413 V0.5.0 (2017 December)
Non Patent Document 28: 3GPP TS 38.420 V0.5.0 (2017 December)

Non Patent Document 29: 3GPP TS 38.423 V0.5.0 (2017 December)

Non Patent Document 30: 3GPP TS 38.470 V15.0.0 (2017 January)

Non Patent Document 31: 3GPP TS 38.473 V15.0.0 (2017 December)

Non Patent Document 32: 3GPP TP 38.801 V14.0.0 (2017 April)

Non Patent Document 33: 3GPP TR 38.802 V14.2.0 (2017 September)

Non Patent Document 34: 3GPP TR 38.803 V14.2.0 (2017 September)

Non Patent Document 35: 3GPP TR 38.804 V14.0.0 (2017 March)

Non Patent Document 36: 3GPP TR 38.900 V14.3.1 (2017 July)

Non Patent Document 37: 3GPP TR 38.912 V14.1.0. (2017 June)

Non Patent Document 38: 3GPP TR 38.913 V14.3.0 (2017 June)

Unfortunately, communication in the connecting cell is interrupted during the gap section, leading to a problem of an increase latency in downlink transmission data occurring during the gap section. That is, since the radio terminal performs the communication frequency changeover to a frequency band different from the frequency used in the connecting cell during the gap section, data transmitted from the radio base station in the connecting cell would not be received by the radio terminal. Therefore, in a case where downlink transmission data occurs in the gap section, the radio base station of the connecting cell waits until the end of the gap section and transmits data after the communication frequency of the radio terminal returns to the frequency used in the connecting cell. This results in the increased latency in a period from the occurrence of downlink transmission data to the actual transmission.

In particular, in a case where the downlink transmission data is data that demands low latency such as URLLC data, satisfying the latency criteria of the demand would be difficult in some cases.

SUMMARY

According to an aspect of an embodiment, a radio base station controls radio communication with a radio terminal using a first radio frequency. The radio base station includes: a controller that controls a period in which the radio terminal enables to measure a second radio frequency different from the first radio frequency; a transmitter that transmits a control signal including information regarding the second radio frequency and the period to the radio terminal; and a transfer unit that transfers data addressed to the radio terminal in a case where the data occurs during the period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited to the present embodiments.

[a] First Embodiment

Figure 1:
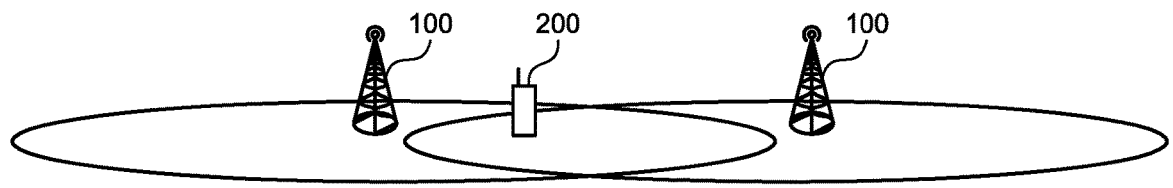
FIG. 1 is a diagram illustrating a configuration of a radio communication system according to a first embodiment.

FIG. 1 is a diagram illustrating a configuration of a radio communication system according to a first embodiment. The radio communication system includes a radio base station which is referred to as a base station device 100 and a radio terminal which is referred to as a terminal device 200. As illustrated in FIG. 1, a base station device 100 each forms a cell that is a region where radio communication is possible, and a terminal device 200 performs radio communication with the base station device 100 of the cell in which the terminal device 200 is located. Hereinafter, a cell formed by the base station device 100 having a radio communication with the terminal device 200 is referred to as a "connecting cell", and a cell in the neighborhood of the connecting cell is referred to as a "neighboring cell". In addition, the base station device 100 of the connecting cell is referred to as a "connecting base station", and the base station device 100 in the neighboring cell is referred to as a "neighboring base station". In FIG. 1, it is assumed that one base station device 100 is a connecting base station and the other base station device 100 is a neighboring base station and the connecting cell and the neighboring cell use mutually different frequency bands.

The terminal device 200 periodically measures the radio quality such as Signal to Interference Ratio (SIR) in the connecting cell and reports the result to the connecting base station. In a case where the reported radio quality falls to a level below a predetermined threshold, the connecting base station sets a gap section for the terminal device 200 to measure the radio quality of a neighboring cell and transmits an instruction to measure the radio quality of the neighboring cell, to the terminal device 200.

After receiving the measurement instruction from the connecting base station, the terminal device 200 switches the communication frequency to the frequency band of a neighboring cell during the gap section and measures the radio quality of the neighboring cell. At this time, for example, there is a conceivable case where URLLC data occurs in the connecting base station. Since the terminal device 200 has switched the communication frequency to the frequency band of the neighboring cell, the URLLC data transmitted from the connecting base station would not be received by the terminal device 200. Therefore, the connecting base station transfers the URLLC data that has occurred during the gap section to the neighboring base station, and the neighboring base station transmits the URLLC data to the terminal device 200. This enables the connecting base station to transmit the URLLC data that demands low latency to the terminal device 200 without waiting until the end of the gap section.

Figure 2:
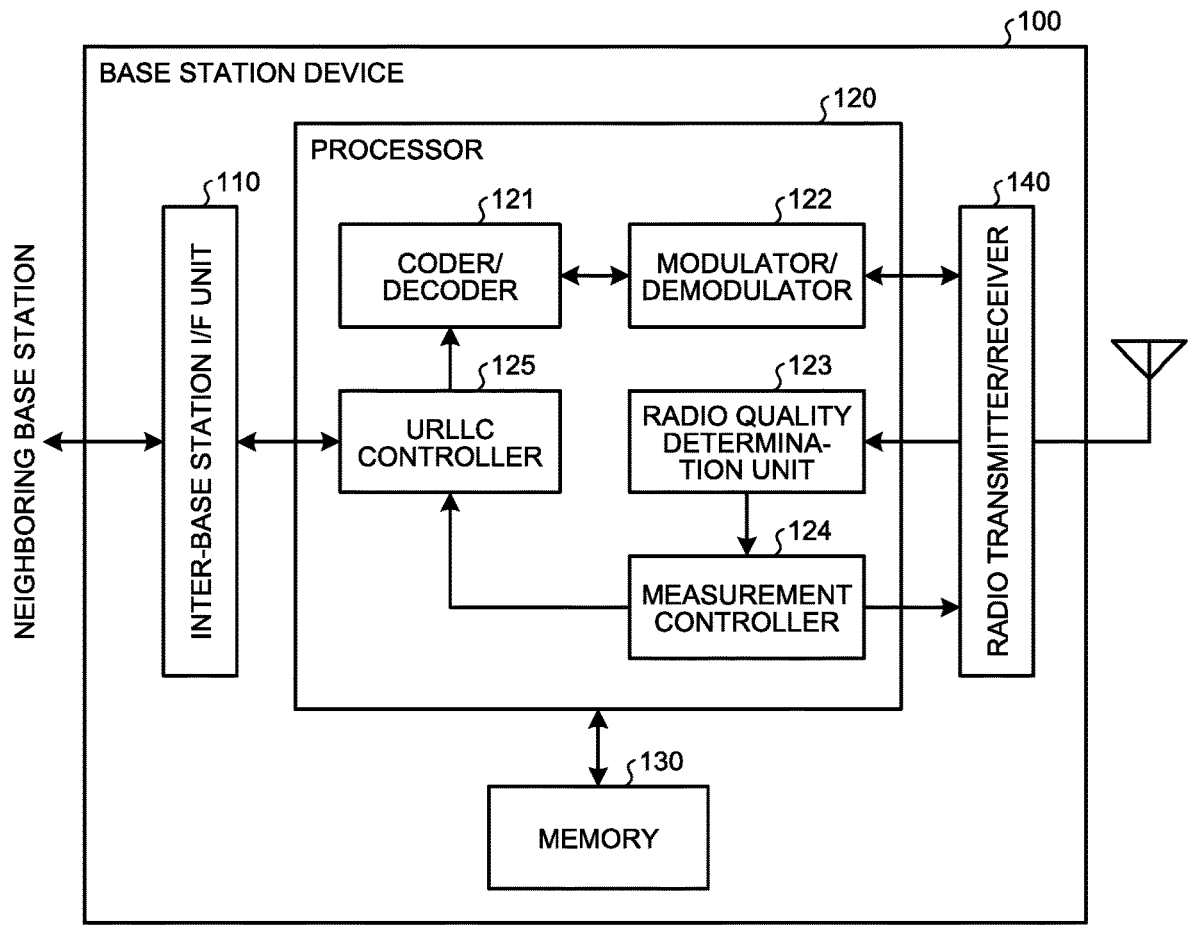
FIG. 2 is a block diagram illustrating a configuration of a base station device according to the first embodiment.

FIG. 2 is a block diagram illustrating a configuration of the base station device 100 according to the first embodiment. FIG. 2 mainly illustrates a configuration of the connecting base station. The base station device 100 illustrated in FIG. 2 includes an inter-base station interface unit (hereinafter abbreviated as "inter-base station I/F unit") 110, a processor 120, memory 130, and a radio transmitter/receiver 140.

The inter-base station I/F unit 110 has an interface for connecting to another base station device 100 and transmits/receives data to/from another base station device 100. When the base station device 100 is the connecting base station, the inter-base station I/F unit 110 transfers the URLLC data occurring during the gap section to a neighboring base station. In contrast, when the base station device 100 is a neighboring base station, the inter-base station I/F unit 110 receives the URLLC data occurring during the gap section from the connecting base station.

The processor 120 includes, for example, a Central Processing Unit (CPU), a Field Programmable Gate Array (FPGA), a Digital Signal Processor (DSP), or the like, and integrally controls the entire base station device 100. Specifically, the processor 120 includes a coder/decoder 121, a modulator/demodulator 122, a radio quality determination unit 123, a measurement controller 124, and a URLLC controller 125.

The coder/decoder 121 executes coding of transmission data and decoding of reception data. Specifically, at the time of occurrence of URLLC data to be transmitted to the terminal device 200, for example, the coder/decoder 121 encodes the URLLC data. The coder/decoder 121 also decodes the reception data output from the modulator/demodulator 122.

The modulator/demodulator 122 executes modulation of transmission data and demodulation of reception data. Specifically, the modulator/demodulator 122 modulates the transmission data encoded by the coder/decoder 121 and outputs the modulated transmission data to the radio transmitter/receiver 140. Furthermore, the modulator/demodulator 122 demodulates the reception data output from the radio transmitter/receiver 140 and outputs the demodulated data to the coder/decoder 121.

The radio quality determination unit 123 acquires a measurement report periodically transmitted from the terminal device 200 which is a measurement report including a measurement result of the radio quality in the connecting cell and determines whether the radio quality of the connecting cell is less than a predetermined measurement threshold. Subsequently, in a case where the radio quality determination unit 123 determines that the radio quality of the connecting cell is less than a predetermined measurement threshold, the radio quality determination unit 123 notifies the measurement controller 124 of that result.

In a case where it is notified from the radio quality determination unit 123 that the radio quality of the connecting cell has fallen below a predetermined measurement threshold, the measurement controller 124 sets a gap section and instructs the terminal device 200 to measure the radio quality of neighboring cells. That is, in a case where the radio quality of the connecting cell is degraded, the measurement controller 124 generates a measurement instruction including information for specifying a gap section together with identification information of the neighboring base station as a measurement target and the frequency band information of the neighboring cells and transmits the instruction to the terminal device 200 via the radio transmitter/receiver 140. At this time, the measurement controller 124 may generate the measurement instruction with the neighboring cell having the best radio quality measured during the gap section up to the previous among the plurality of neighboring cells, as the measurement target. The measurement controller 124 also outputs the information included in the measurement instruction to the URLLC controller 125. An example of the information for specifying the gap section is information of the start time and the end time of the gap section.

The URLLC controller 125 controls transmission/reception of URLLC data. Specifically, in a case where URLLC data to be transmitted has occurred by acquiring the URLLC data addressed to the terminal device 200 from a core network, far example, the URLLC controller 125 outputs the URLLC data to the coder/decoder 121. Furthermore, in a case of occurrence of URLLC data to be transmitted during the gap section, the URLLC controller 125 determines whether the radio quality in the previous gap section of the neighboring cell as a measurement target is a predetermined transmission threshold or more. Subsequently, in a case where the radio quality in the previous gap section of the neighboring cell is a predetermined transmission threshold or more, the URLLC controller 125 transfers the URLLC data to the neighboring base station forming this neighboring cell via the inter-base station I/F unit 110. Note that in a case where the base station device 100 is a neighboring base station, the URLLC controller 125 outputs the URLLC data transferred from the connecting cell during the gap section to the coder/decoder 121.

The memory 130 includes. Random Access Memory (RAM) or Read Only Memory (ROM), and stores information used by the processor 120 to execute processes. Specifically, the memory 130 stores the radio quality of the neighboring cell measured by the terminal device 200 during the gap section, for example.

The radio transmitter/receiver 140 performs radio transmission processes such as Digital/Analog (D/A) conversion and up-conversion on transmission data, and transmits the processed data via an antenna. The transmission data transmitted by the radio transmitter/receiver 140 includes, for example, data signals such as URLLC data and control signals such as measurement instructions. The radio transmitter/receiver 140 also performs radio reception processes such as down-conversion and A/D (Analog/Digital) conversion on the reception data received via the antenna, and outputs the processed data to the processor 120. The reception data received by the radio transmitter/receiver 140 includes, for example, a measurement report including the measurement result of the radio quality of neighboring cell and reception acknowledgment information for the URLLC data. Note that the radio transmitter/receiver 140 may be divided into a radio transmitter and a radio receiver.

Figure 3:
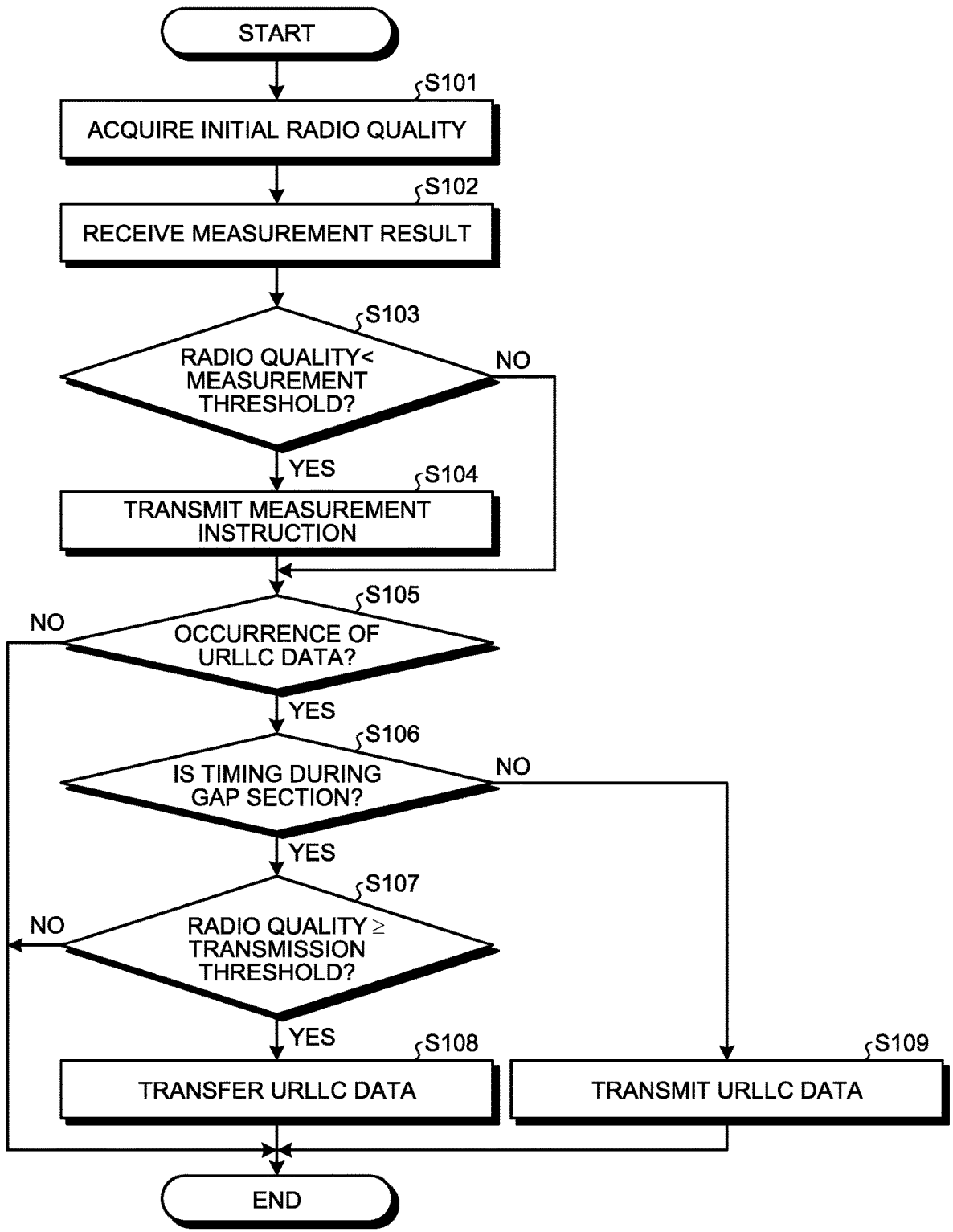
FIG. 3 is a flowchart illustrating operation of the base station device according to the first embodiment.

Next, operation of the base station device 100 configured as above will be described with reference to the flowchart illustrated in FIG. 3. In the following, the operation in a case where the base station device 100 is a connecting base station will be described.

In a case where the base station device 100 is a connecting base station for the terminal device 200, the base station device 100 is notified from the core network that the terminal device 200 is a terminal device that is to receive the URLLC service. Receiving this notification, the base station device 100 collects initial radio quality in neighboring cells (step S101). Specifically, a gap section is set by the measurement controller 124, an instruction to measure the radio quality of each of neighboring cells is transmitted to the terminal device 200, and the radio quality information regarding the neighboring cells measured by the terminal device 200 is acquired. The radio quality information regarding the neighboring cells is stored in the memory 130 in association with the identification information of the neighboring base stations.

Subsequently, when the radio communication between the base station device 100 and the terminal device 200 is started, the terminal device 200 periodically measures the radio quality of the connecting cell, and transmits a measurement report including the measurement result of the radio quality of the connecting cell. The measurement report is received by the radio transmitter/receiver 140 of the base station device 100 (step S102) and is acquired by the radio quality determination unit 123. Subsequently, the radio quality determination unit 123 compares the radio quality of the connecting cell with a predetermined measurement threshold (step S103). In a case where the radio quality is less than the predetermined measurement threshold (Yes in step S103), the measurement controller 124 will be, notified of the comparison result.

Upon receiving this notification, the measurement controller generates an instruction to measure the neighboring cell. That is, the measurement controller 124 refers to the past radio quality of each of neighboring cells stored in the memory 130 and determines the neighboring cell having the best radio quality as the neighboring cell as a measurement target. Here, for example, the neighboring cell as a measurement target in the current gap section is determined based on the initial radio quality and the radio quality measured up to the previous gap section in the neighboring cells. Subsequently, a measurement instruction will be generated including the identification information of the neighboring base station forming the neighboring cell as a measurement target, the frequency band information regarding the neighboring cell, and including the information specifying the gap section such as the start time and the end time. The generated measurement instruction is transmitted to the terminal device 200 via the radio transmitter/receiver 140 (step S104). The information included in the measurement instruction is also output to the URLLC controller 125.

When these processes are executed, the URLLC controller 125 also monitors whether URLLC data has occurred (step S105). That is, for example, whether the URLLC data addressed to the terminal device 200 has been received from the core network is monitored. In a case where the URLLC data has not occurred (No in step S105), the process related to the URLLC data transmission will end. In contrast, in a case where the URLLC data has occurred (Yes in step S105), the URLLC controller 125 refers to the information output from the measurement controller 124 to judge whether the timing is during the gap section (step S106). When the timing is not during the gap section (No in step S106), the URLLC data that has occurred is output to the coder/decoder 121, encoded by the coder/decoder 121, modulated by the modulator/demodulator 127. The URLLC data thereafter undergoes radio transmission process by the radio transmitter/receiver 140 and then is transmitted to the terminal device 200 via an antenna (step S109). In this manner, in a case where the occurrence timing of the URLLC data is not during the gap section, the URLLC data will be immediately transmitted from the base station device 100 with no latency.

In contrast, in a case where the URLLC data occurs during the gap section (Yes in Step S106), the URLLC controller 125 refers to the radio quality information regarding the neighboring cells, and determination is made as to whether the past radio quality of the neighboring cell as a measurement target during the gap section is a predetermined transmission threshold or more (step S107). That it is determined whether the radio quality during the previous gap section of the neighboring cell on which the terminal device 200 will measure the radio quality during the current gap section is a predetermined transmission threshold or more. In a case where the radio quality of the neighboring cell is less than the predetermined transmission threshold as a result of this determination (No in step S107), considered that transmission of the URLLC data would be difficult in the neighboring cell, and thus, the URLLC data will be discarded or transmitted after the end of the gap section.

In a case where the radio quality of the neighboring cell is a predetermined transmission threshold or more (Yes in step S107), it is considered that transmission of the URLLC data in the neighboring cell is possible, and thus, the URLLC data will be transferred by the URLLC controller 125 to the neighboring base station via the inter-base station I/F unit 110 (step S108). The transferred URLLC data is input to the URLLC controller 125 of the neighboring base station, and passes through the coder/decoder 121, the modulator/demodulator 122, and the radio transmitter receiver 140 so as to be transmitted to the terminal device 200 via an antenna. Here, since the terminal device 200 switches the communication frequency to the frequency band of the neighboring cell in measuring the radio quality, the URLLC data transmitted from the neighboring base station is received by the terminal device 200. In this manner, in a case where the occurrence timing of the URLLC data is during the gap section, the URLLC data is transferred to the neighboring base station and immediately transmitted from the neighboring base station. Therefore, even when the terminal device 200 has switched the communication frequency during the gap section, it is possible to suppress data transmission latency.

Figure 4:
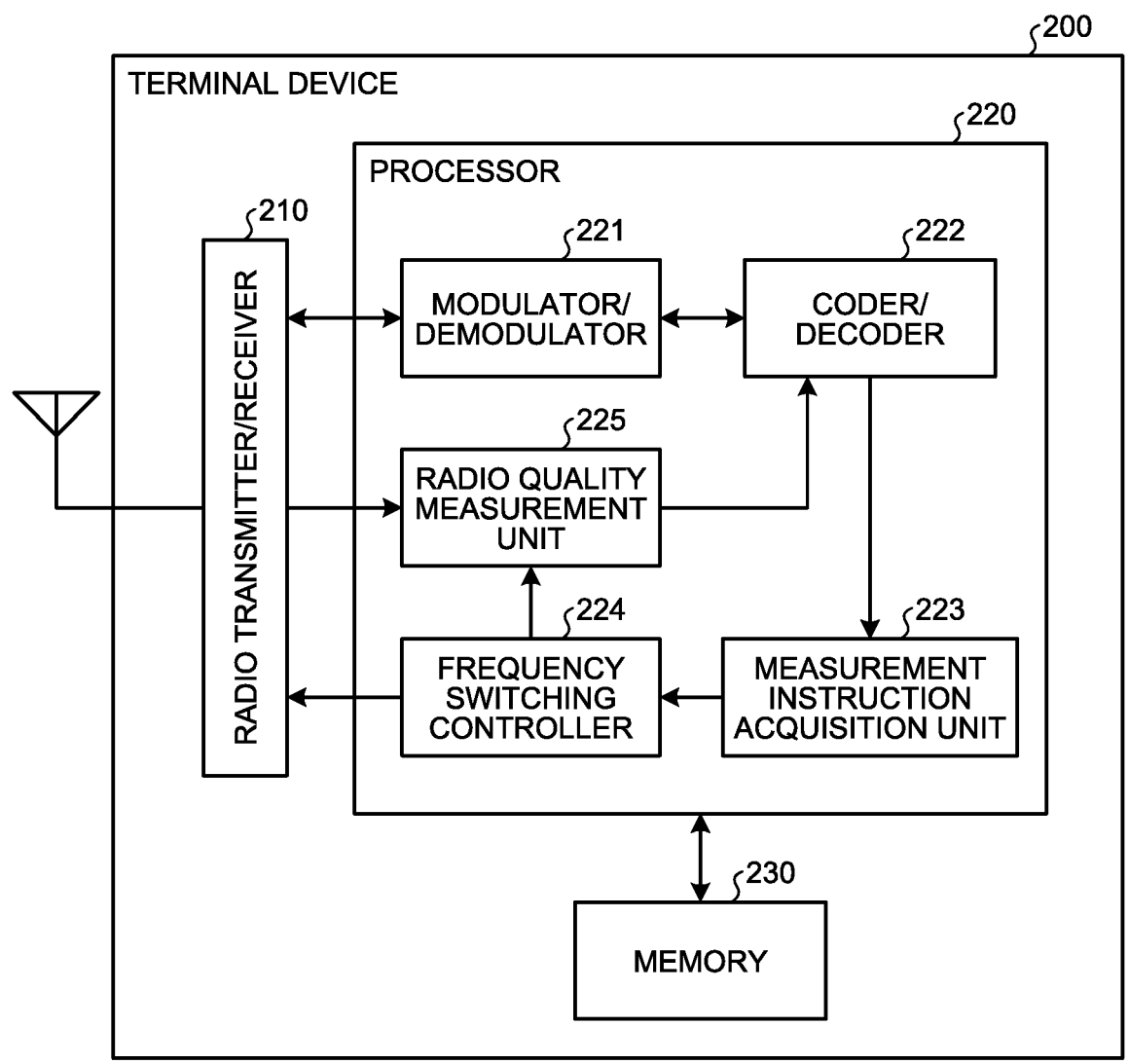
FIG. 4 is a block diagram illustrating a configuration of a terminal device according to the first embodiment.

FIG. 4 is a block diagram illustrating a configuration of the terminal device 200 according to the first embodiment. The terminal device 200 illustrated in FIG. 4 includes a radio transmitter/receiver 210, a processor 220, and memory 230.

The radio transmitter/receiver 210 also performs radio reception processes such s down-conversion and A/D conversion on the reception data received via an antenna, and outputs the processed data to the processor 220. The reception data received by the radio transmitter/receiver 210 includes URLLC data and measurement instructions, for example. Furthermore, the radio transmitter/receiver 210 performs radio transmission processes such as D/A conversion and up-conversion on transmission data, and transmits the data via an antenna. The transmission data transmitted by the radio transmitter/receiver 210 includes a measurement report including the measurement result of the radio quality of neighboring cells.

The processor 220 includes a CPU, an FPGA, a DSP, for example, and comprehensively controls the entire terminal device 200. Specifically, the processor 220 includes a modulator/demodulator 221, a coder/decoder 222, a measurement instruction acquisition unit 223, a frequency switching controller 224, and a radio quality measurement unit 225.

The modulator/demodulator 221 executes demodulation of reception data and modulation of transmission data. Specifically, the modulator/demodulator 221 demodulates the reception data output from the radio transmitter/receiver 210 and outputs the demodulated data to the coder/decoder 222. Furthermore, the modulator/demodulator 221 modulates the transmission data encoded by the coder/decoder 222 and outputs the modulated data to the radio transmitter/receiver 210.

The coder/decoder 222 executes decoding of reception data and coding of transmission data. Specifically, the coder/decoder 222 decodes the reception data output from the modulator/demodulator 221. In addition, in a case where a measurement result of the radio quality of the connecting cell or the neighboring cell is obtained, for example, the coder/decoder 222 encodes a measurement report including the measurement result.

The measurement instruction acquisition unit 223 acquires a measurement instruction from the reception data decoded by the coder/decoder 222. The measurement instruction includes identification information of the neighboring base station as a measurement target and the information of the frequency band of the neighboring cell, as well as the information specifying the gap section. Based on the measurement instruction, the measurement instruction acquisition unit 223 notifies the frequency switching controller 224 of the start time and end time of the gap section as well as the frequency band of the neighboring cells.

The frequency switching controller 224 switches the communication frequency in the radio transmitter/receiver 210 based on the notification from the measurement instruction acquisition unit 223. Specifically, the frequency switching controller 224 sets the communication frequency in the radio transmitter/receiver 210 to the frequency band of the connecting cell while there is no notification from the measurement instruction acquisition unit 223. Subsequently, upon receiving the notification from the measurement instruction acquisition unit 223, the frequency switching controller 224 switches the communication frequency in the radio transmitter/receiver 210 to the frequency band of the neighboring cell at the start time of the gap section. After the communication frequency is switched to the frequency band of the neighboring cell, the frequency switching controller 224 notifies the radio quality measurement unit 225 to that effect. Furthermore, the frequency switching controller 224 switches the communication frequency in the radio transmitter/receiver 210 to the frequency band of the connecting cell at the end time of the gap section.

The radio quality measurement unit 225 measures the radio quality of the connecting cell or the neighboring cell using a pilot signal transmitted from the connecting base station or the neighboring base station. Specifically, during the connection to the connecting base station, the radio quality measurement unit 225 measures the radio quality such as SIR in a connecting cell using a pilot signal periodically transmitted from the connecting base station. Subsequently, the radio quality measurement unit 225 generates a measurement report including the radio quality measurement result, and outputs the measurement report to the coder/decoder 222. Furthermore, when the communication frequency is switched during the gap section, the radio quality measurement unit 225 measures the radio quality such as SIR in a neighboring cell using a pilot signal periodically transmitted from the neighboring base station. Subsequently, the radio quality measurement unit 225 generates a measurement report including the measurement result of the radio quality of the neighboring cells after the end of the gap section and transmits the generated measurement report to the connecting base station.

The memory 230 includes RAM or ROM, for example, and stores information used by the processor 220 to execute processes.

Next, the URLLC data transmission process in the radio communication system configured as described above will be described with reference to the sequence diagram illustrated in FIG. 5. In the following, it is assumed that the terminal device 200 is connected to a base station device 100a that is a connecting base station and that a base station device 100b being a neighboring base station is located in the neighbor of the connecting base station.

When the terminal device 200 connects to the base station device 100a being the connecting base station, the base station device 100a is notified from the core network, for example, that the terminal device 200 is a terminal device that is to receive the URLLC service. Upon receiving this notification, the base station device 100a sets a gap section in order to collect initial radio quality in neighboring cells. Subsequently, the terminal device 200 receives, during the gap section, a pilot signal from the neighboring base station including the base station device 100b (step S201), and measures the radio quality of the neighboring cells. The radio quality information regarding the neighboring cells is transmitted to the base station device 100a after the end of the gap section (step S202), and the initial radio quality information regarding the neighboring cells is stored in the base station device 100a.

Thereafter, radio communication is performed between the base station device 100a being the connecting base station and the terminal device 200, and the terminal device 200 uses a pilot signal periodically transmitted from the base station device 100a to measure the radio quality of the connecting cell. A measurement report including the radio quality measurement result is transmitted from the terminal device 200 to the base station device 100a(step S203), and the radio quality of the connecting cell is determined by the radio quality determination unit 123 of the base stab on device 100a (step S204). That is, it is determined whether the radio quality of the connecting cell is less than a predetermined measurement threshold. In a case where the radio quality of the connecting cell is a predetermined measurement threshold or more, radio communication between the base station device 100a and the terminal device 200 would be continued. However, here, description will continue assuming that the radio quality of the connecting cell is less than a predetermined measurement threshold.

In the case where the radio quality of the connecting cell is less than the predetermined measurement threshold, the measurement controller 124 determines the neighboring cell having the best initial radio quality as the neighboring cell as a measurement target, and a measurement instruction is generated that instructs measurement of the radio quality of the neighboring cell during the gap section. Here, it is assumed that the radio quality of the neighboring cell formed by the base station device 100b is the best and that this neighboring cell is determined as the measurement target. The measurement instruction includes the identification information of the neighboring base station forming the neighboring cell as a measurement target, the frequency band information regarding the neighboring cell, as well as the information specifying the gap section such as the start time and the end time. The generated measurement instruction is transmitted from the base station device 100a, which is the connecting base station, to the terminal device 200 (step S205).

When the measurement instruction is received by the terminal device 200, the measurement instruction is acquired by the measurement instruction acquisition unit 223 of the terminal device 200, and then the frequency switching controller 224 switches the communication frequency during the gap section to the frequency band of the neighboring cell as a measurement target. Therefore, during the gap section, the terminal device 200 does not receive the signal transmitted from the base station device 100a, which is a connecting base station, but receives the signal transmitted from the base station device 100b, which a neighboring base station. Accordingly, the terminal device 200 receives a pilot signal transmitted from the base station device 100b (step S206 and the radio quality measurement unit 225 of the terminal device 200 measures the radio quality of the neighboring cells using the signal.

Meanwhile, when the URLLC data addressed to the terminal device 200 occurs in the base station device 100a which is the connecting base station during the gap section, the URLLC controller 125 determines whether the radio quality of the neighboring cell as a measurement target for the gap section is a predetermined transmission threshold or more. That is, it is determined whether the initial radio quality or the radio quality in the previous gap section in the neighboring cell is a predetermined transmission threshold or more. Here, the description will continue assuming that the past radio quality of the neighboring cell formed by the base station device 100b is a predetermined transmission threshold or more.

In a case where the past radio quality of the neighboring cell is a predetermined transmission threshold or more, it is judged that the URLLC data can be transmitted in the neighboring cell, and then the URLLC data is transferred to the base station device 100b being a neighboring base station (step S207). The URLLC data passes through the URLLC controller 125 the coder/decoder 121, the modulator/demodulator 122, and the radio transmitter/receiver 140 of the base station device 100b so as to be transmitted to the terminal device 200 (step S208). That is, the URLLC data occurring during the gap section is transmitted in the frequency band of the neighboring cell, rather than in the frequency band of the connecting cell. Therefore, the terminal device 200 that has switched the communication frequency during the gap section can receive the URLLC data, making it possible to minimize the URLLC data latency.

When the URLLC data transmitted from the base station device 100b being a neighboring base station is received, ACK or NACK is transmitted to the base station device 100b s a URLLC data reception acknowledgment response (step S209). That is, as a result of the decoding by the coder/decoder 222 of the terminal device 200, ACK is transmitted when the URLLC data is normally decoded, while NACK is transmitted when the URLLC data needs to be retransmitted. The ACK or NACK is transferred from the base station device 100b to the base station device 100a (step S210).

Thereafter, at the end time of the gap section, the frequency switching controller 224 of the terminal device 200 switches the communication frequency to the frequency band of the connecting cell. This enables radio communication between the base station device 100a being the connecting base station and the terminal device 200, and a measurement report regarding the radio quality of the neighboring cells measured during the gap section is transmitted from the terminal device 200 to the base station device 100a(step S211). The measurement report on the radio quality of a neighboring cell is used as a basis of judgment as to whether to perform handover of the terminal device 200 to the neighboring cell.

As described above, according to the present embodiment, in a case where the radio quality of the connecting cell is degraded, the gap section is set and the radio quality of the neighboring cells is, measured by the terminal device. At the same time, the URLLC data occurring during the gap section is transferred from the connecting base station to the neighboring base station and then transmitted from the neighboring base station to the terminal device. Therefore, even when the terminal device has switched the communication frequency during the gap section, the URLLC data can be received by the terminal device, and the URLLC data can be transmitted without waiting for the end of the gap section. In other words, possible to suppress the data transmission latency even with the setting of the gap section during which the terminal device switches the communication frequency.

Note that while the first embodiment is an example in which ACK or NACK for URLLC data is transmitted to the connecting base station via the neighboring base station, ACK and NACK may be directly transmitted to the connecting base station after the end of the gap section. FIG. 6 is a sequence diagram when ACK or NACK is directly transmitted to the connecting base station. In FIG. 6, the same components as those in FIG. 5 are designated by the same reference numerals.

Figure 5:
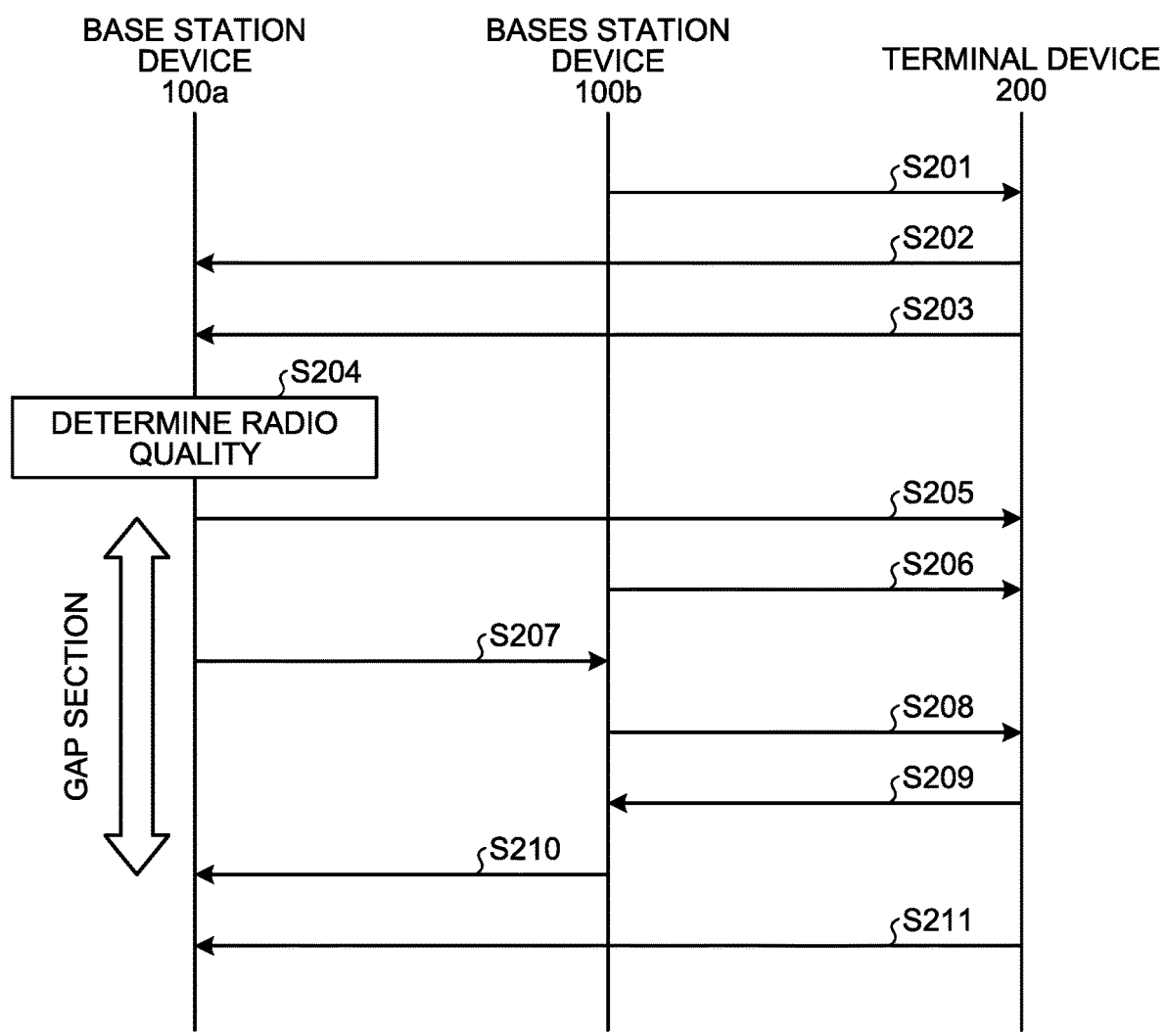
FIG. 5 is a sequence diagram illustrating a URLLC data transmission process according to the first embodiment.
Figure 6:
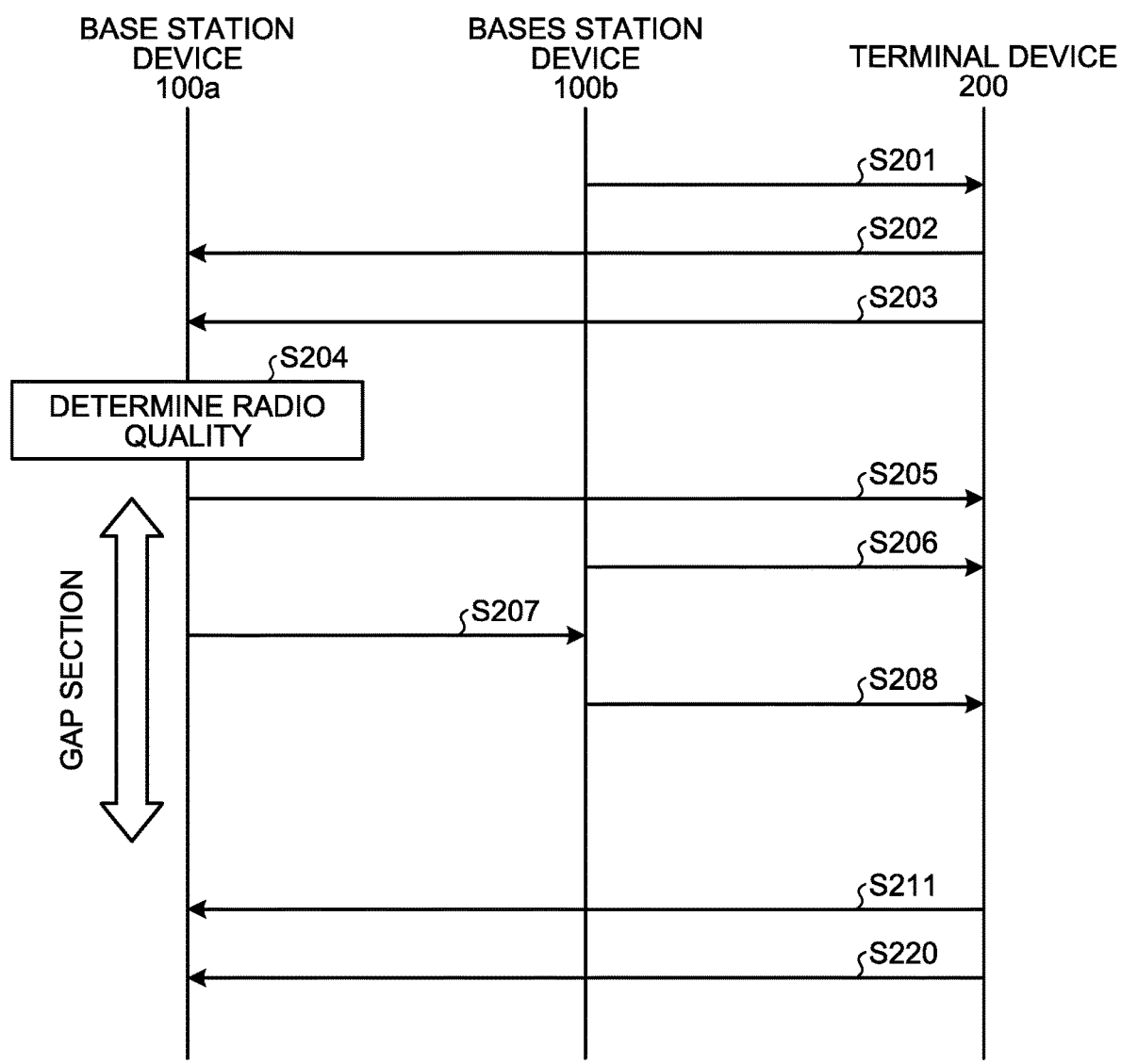
FIG. 6 is a sequence diagram illustrating another URLLC data transmission process according to the first embodiment.

As illustrated in FIG. 6, similarly to the URLLC data tram mission process of FIG. 5, the URLLC data transferred from the base station device 100 being a connecting base station to the base station device 100b being a neighboring base station during the gap section (step (S207), and the URLLC data is then transmitted from the base station device 100b to the terminal device 200 (step S208). Note that in the URLLC data transmission process illustrated in FIG. 6, ACK or NACK for the URLLC data is not transmitted during the gap section. That is, simultaneously with the transmission or just before or after the transmission of the measurement report of the radio quality of the neighboring cells from the terminal device 200 to the base station device 100a in step S211 after the end of the gap section, ACK or NACK for the URLLC data transmitted during the gap section is directly transmitted from the terminal device 200 to the base station device 100a(step S220). In this manner, it is possible to transmit the ACK and NACK for the URLLC data transmitted from the neighboring base stations during the gap section to the connecting base station after the end of the gap section.

Figure 7:
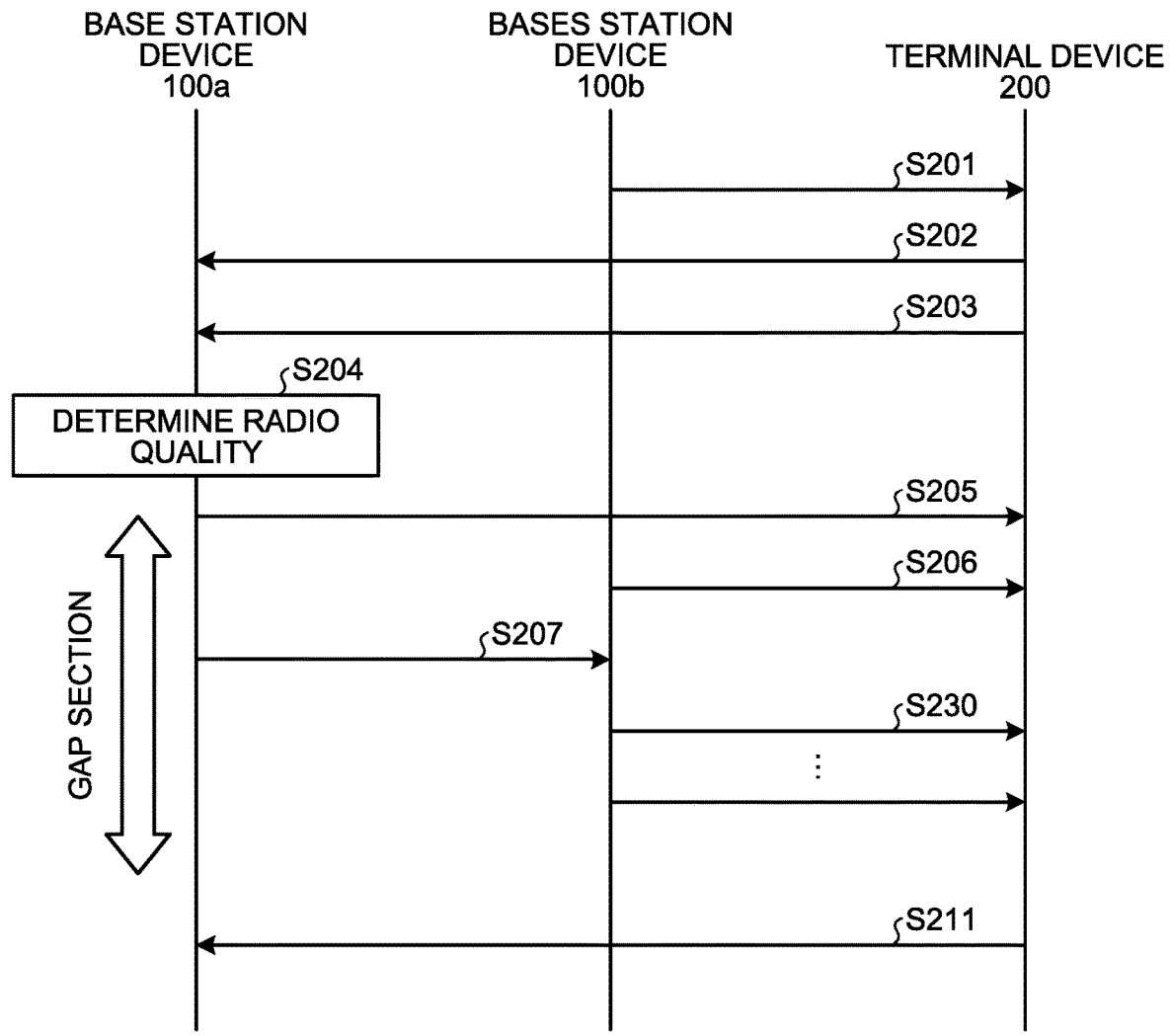
FIG. 7 is a sequence diagram illustrating still another URLLC data transmission process according to the first embodiment.

Furthermore, for example, it is allowable to repeatedly transmit the URLLC data from the neighboring base stations during the gap section to improve the reliability of URLLC data transmission. FIG. 7 is a sequence diagram of the case of repeated transmission of the URLLC data. In FIG. 7, the same components as those in FIG. 5 are designated by the same reference numerals.

As illustrated in FIG. 7, similarly to the URLLC data, transmission process of FIG. 5, the URLLC data is transferred from the base station device 100 being a connecting base station to the base station device 100b being a neighboring base station during the gap section (step (S207)). Subsequently, the base station device 100b repeatedly transmits the transferred URLLC data to the terminal device 200 (step S230). By repeatedly transmitting the URLLC data in this manner, it is possible to achieve high redundancy and improve the reliability of URLLC data transmission. Furthermore, in a case where the URLLC data is repeatedly transmitted, as illustrated in FIG. 7, the transmission of ACK or NACK for the URLLC data may be omitted.

[b] Second Embodiment

A second embodiment is characterized in that URLLC data is transferred between a plurality of cells generated by one base station device.

Figure 8:
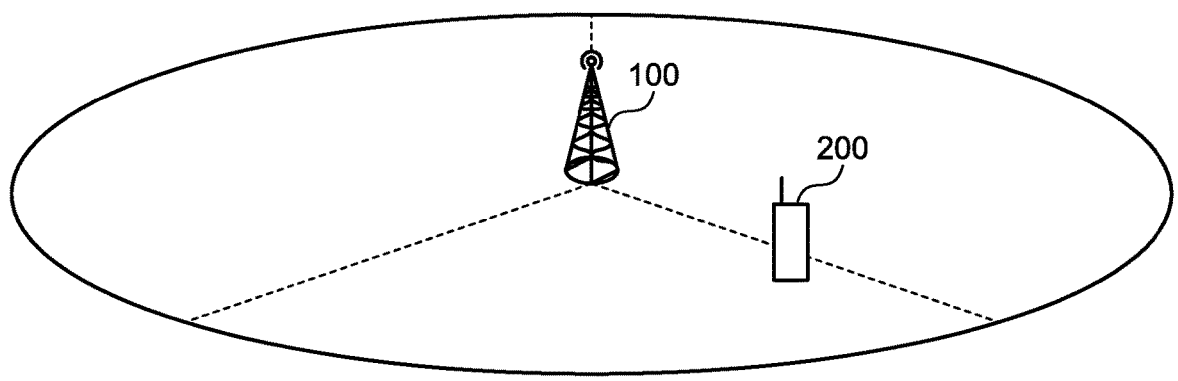
FIG. 8 is a diagram illustrating a configuration of a radio communication system according to a second embodiment.

FIG. 8 is a diagram illustrating a configuration of a radio communication system according to the second embodiment. As illustrated in FIG. 8, the base station device 100 forms a plurality of cells having boundaries indicated by broken lines in the figure. The terminal device 200 performs radio communication with the base station device 100 via the cell where the device is located. Hereinafter, similar to the first embodiment, the cell used by the terminal device 200 to connect to the base station device 100 is referred to as a "connecting cell", and cells around the connection cell are referred to as "neighboring cells". FIG. 8 assumes that one cell formed by the base station device 100 is a connecting cell, and another cell formed by the base station device 100 is a neighboring cell and that the connecting cell and the neighboring cell use mutually different frequency bands.

The terminal device 200 periodically measures the radio quality such as SIR in the connecting cell and reports the result to the base station device 100. The base station device 100 sets a gap section for the terminal device 200 to measure the radio quality of the neighboring cells in a case where the reported radio quality falls to a level below a predetermined threshold, and transmits an instruction to measure the radio quality of the neighboring cells to the terminal device 200.

After receiving the measurement instruction from the base station device 100, the terminal device 200 switches the communication frequency to the frequency band of a neighboring cell in the gap section and measures the radio quality of the neighboring cell. At this time, for example, there is a conceivable case where URLLC data has occurred in the base station device 100. Since the terminal device 200 has switched the communication frequency to the frequency band of the neighboring cell, the URLLC transmitted from the base station device 100 via the connection cell would not be received by the terminal device 200. Therefore, the base station device 100 transmits the URLLC data that has occurred during the gap section to the terminal device 200 via the neighboring cell. This enables the base station device 100 to transmit the URLLC data that demands low latency to the terminal device 200 without waiting until the end of the gap section.

Figure 9:
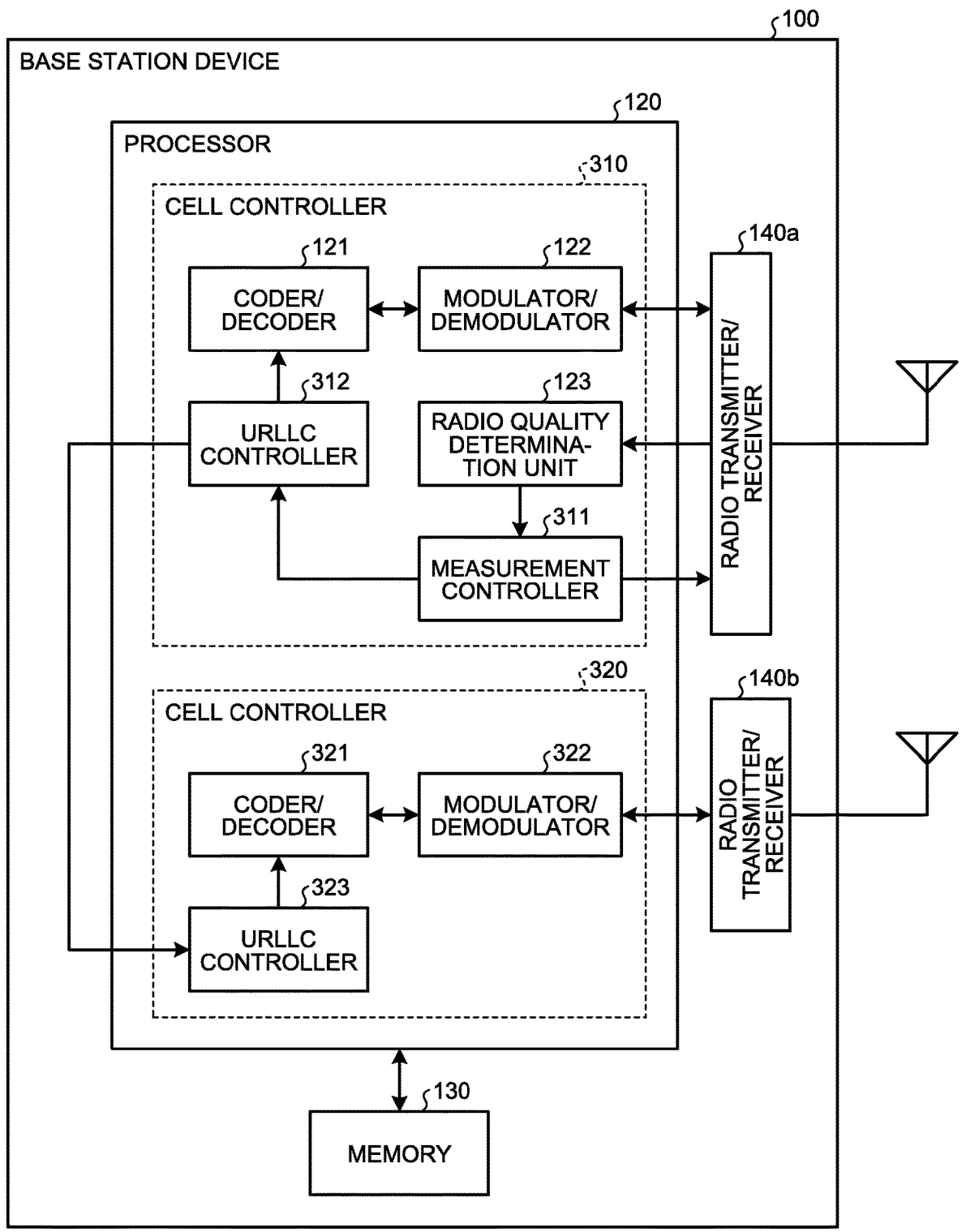
FIG. 9 is a block diagram illustrating a configuration of a base station device according to the second embodiment.

FIG. 9 is a diagram illustrating a configuration of the base station device 100 according to the second embodiment. In FIG. 9, the same components as those in FIG. 2 are designated by the same reference numerals, and the description thereof will be omitted. The base station device 100 illustrated in FIG. 9 includes radio transmitter/receivers 140a and 140b instead of the radio transmitter/receiver 140 of the base station device 100 illustrated in FIG. 2 and includes cell controllers 310 and 320 respectively corresponding to the radio transmitter/receivers 140a and 140b in the processor 120, respectively.

The cell controller 310 corresponds to the radio transmitter/receiver 140a and controls a connecting cell for performing radio communication the terminal device 200. Specifically, the cell controller 310 includes a coder/decoder 121, a modulator/demodulator 122, a radio quality determination unit 123, a measurement controller 311, and a URLLC controller 312.

In a case where it is notified from the radio quality determination unit 123 that the radio quality of the connecting cell has fallen below a predetermined measurement threshold, the measurement controller 311 sets a gap section and instructs the terminal device 200 to measure the radio quality of neighboring cells. That is, in a case where the radio quality of the connecting cell is degraded, the measurement controller 311 generates a measurement instruction including information for specifying a gap section together with identification information and frequency band information of the neighboring cell as a measurement target and transmits the instruction to the terminal device 200 via the radio transmitter receiver 140a. At this time, the measurement controller 311 may generate the measurement instruction with the neighboring cell having the best radio quality measured during the gap section up to the previous time among the plurality of neighboring cells, as the measurement target. The measurement controller 311 also outputs the information included in the measurement instruction to the URLLC controller 312. An example of the information for specifying the gap section is information of the start time and the end time of the gap section.

The URLLC controller 312 controls transmission/reception of URLLC data. Specifically, in a case where URLLC data to be transmitted has occurred by acquiring the URLLC data addressed to the terminal device 200 from a core network, for example, the URLLC controller 312 outputs the URLLC data to the coder/decoder 121. Furthermore, in a case of occurrence of URLLC data to be transmitted during the gap section, the URLLC controller 312 determines whether the radio quality in the previous gap section of the neighboring cell as a measurement target is a predetermined transmission threshold or more. Subsequently, in a case where the radio quality in the previous gap section of the neighboring cell is a predetermined transmission threshold or more, the URLLC controller 312 transfers the URLLC data to the cell controller 320 corresponding to this neighboring cell.

The cell controller 320 corresponds to the radio transmitter/receiver 140b and controls neighboring cells around the connecting cell. Specifically, the cell controller 320 includes a coder/decoder 321, a modulator/demodulator 322, and a URLLC controller 323.

The coder/decoder 321 executes coding of transmission data and decoding of reception data. Specifically, the coder/decoder 321 encodes the URLLC data output from the URLLC controller 323 during the gap section, for example. The coder/decoder 321 also decodes the reception data output from the modulator/demodulator 322.

The modulator/demodulator 322 executes modulation of transmission data and demodulation of reception data. Specifically, the modulator/demodulator 322 modulates the transmission data encoded by the coder/decoder 321 and outputs the modulated transmission data to the radio transmitter/receiver 140b. Furthermore, the modulator/demodulator 322 demodulates the reception data output from the radio transmitter/receiver 140b and outputs the demodulated data to the coder/decoder 321.

The URLLC controller 323 controls the transmission/reception of URLLC data. Specifically, the URLLC controller 323 acquires the URLLC data transferred from the cell controller 310 corresponding to the connecting cell during the gap section, and outputs the acquired URLLC data to the coder/decoder 321.

The radio transmitter/receiver 140a forms a connecting cell of the terminal device 200 and performs radio communication with the terminal device 200 via the connecting cell. At this time, the radio transmitter/receiver 140a performs radio transmission processes sun as D/A conversion and up-conversion on transmission data, and transmits the processed data via an antenna. The transmission data transmitted by the radio transmitter/receiver 140a includes URLLC data and measurement instructions, for example. Furthermore, the radio transmitter/receiver 140a performs radio reception processes such as down-conversion and A/D conversion on the reception data received via an antenna, and outputs the processed data to the processor 120. The reception data received by the radio transmitter/receiver 140a includes a measurement report including the measurement result of the radio quality of neighboring cells.

The radio transmitter/receiver 140b forms a neighboring cell of the terminal device 200 and performs radio communication with the terminal device 200 via the neighboring cell. At this time, the radio transmitter/receiver 140b performs radio transmission processes such as D/A conversion and up-conversion on transmission data, and transmits the processed data via an antenna. The transmission data transmitted by the radio transmitter/receiver 140b includes URLLC data that has occurred during the gap section, for example. Furthermore, the radio transmitter/receiver 140b performs radio reception processes such as down-conversion and A/D conversion on the reception data received via the antenna, and outputs the processed data to the processor 120. The reception data received by the radio transmitter/receiver 140b includes AK or NACK transmitted from the terminal device 200 during the gap section, for example.

In FIG. 9, the radio transmitter/receivers 140a and 140b are provided inside the base station device 100. However, a radio device including the radio transmitter/receivers 140a and 140b may be provided separately. That is, it is allowable to construct a radio communication system in which a plurality of Distributed Units (DUs) each having the radio transmitter/receiver 140a and 140b is connected to a Central Unit (CU) having the processor 120, and each of the DUs forms a connecting cell or a neighboring cell.

The configuration of the terminal device 200 according to the second embodiment is similar to the terminal device 200 (FIG. 4) of the first embodiment, and thus, description will be omitted.

Figure 10:
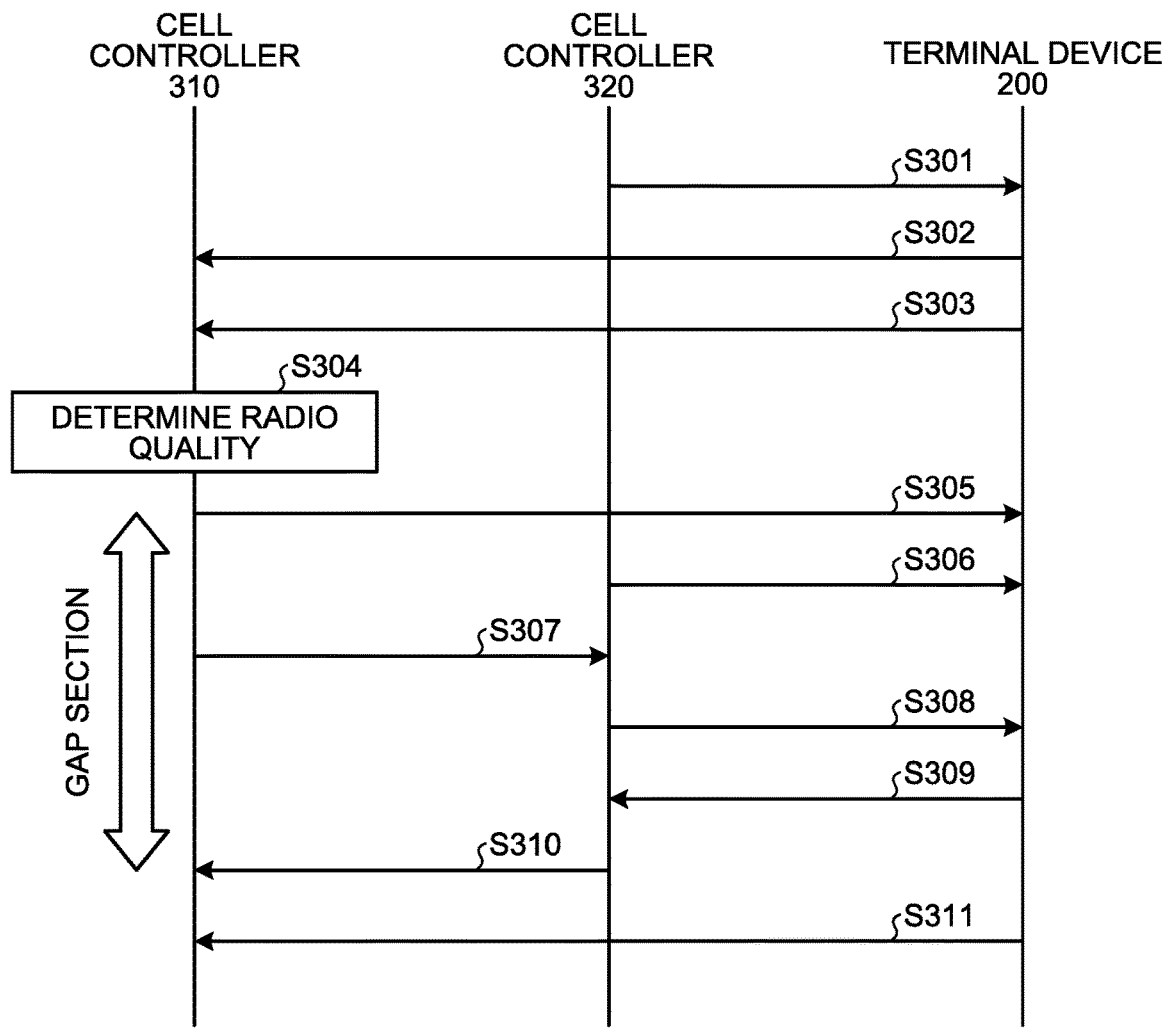
FIG. 10 is a sequence diagram illustrating a URLLC data transmission process according to the second embodiment.

Next, the URLLC data transmission process in the radio communication system configured as described above will be described with reference to the sequence diagram illustrated in FIG. 10. In the following, it is assumed that the to device 200 is connected t a connecting cell controlled by the cell controller 310, and there is neighboring cell controlled by the cell controller 320 around the connecting cell.

When the terminal device 200 connects to the connecting cell, the base station device 100 is notified from the core network, for example, that the terminal device 200 is a terminal device that is to receive the URLLC service. Upon receiving this notification, the cell controller 310 that controls the connecting cell sets a gap section in order to collect initial radio quality in neighboring cells. Subsequently, the terminal device 200 receives, during the gap section, a pilot signal transmitted via a neighboring cell corresponding to the cell controller 320 (step S301), and measures the radio quality of the neighboring cell. The radio quality information regarding the neighboring cell is transmitted via the connecting cell after the end of the gap section (step S302), and the initial radio quality information regarding the neighboring cell is stored in the memory 130.

Subsequently, radio communication is performed between the base station device 100 and the terminal device 200 via the connecting cell, the terminal device 200 measures the radio quality of the connecting cell using a pilot signal periodically transmitted via the connecting cell. A measurement report including the radio quality measurement result is transmitted from the terminal device 200 via the connecting cell (step S303), and the radio quality of the connecting cell is determined by the radio quality determination unit 123 of the cell controller 310 (step S304). That is, it is determined whether the radio quality of the connecting cell is less than a predetermined measurement threshold. In a case where the radio quality of the connecting cell is a predetermined measurement threshold or more, radio communication via the connecting cell would be continued. However, here, description will continue assuming that the radio quality of the connecting cell is less than a predetermined measurement threshold.

In the case where the radio quality of the connecting cell is less than the predetermined measurement threshold, the measurement controller 311 determines the neighboring cell having the best initial radio quality as the neighboring cell as a measurement target, and a measurement instruction is generated that instructs measurement of the radio quality of the neighboring cell during the gap section. Here, it is assumed that the radio quality of the neighboring cell corresponding to the cell controller 320 is the best and that this neighboring cell is determined as the measurement target. The measurement instruction includes the identification information and the frequency band information of the neighboring cell as the measurement target and also includes the information that specifies the gap section such as the start time and the end time. The generated measurement instruction is transmitted to the terminal device 200 via the connecting cell (step S305).

When the measurement instruction is received by the terminal device 200, the measurement instruction is acquired by the measurement instruction acquisition unit 223 of the terminal device 200, and then the frequency switching controller 224 switches the communication frequency during the gap section to the frequency band of the neighboring cell as a measurement target. Therefore, during the gap section, the terminal device 200 does not receive the signal transmitted via the connecting cell but receives the signal transmitted via the neighboring cell. Accordingly, the terminal device 200 receives a pilot signal transmitted via the neighboring cell (step S306), and the radio quality measurement unit 225 of the terminal device 200 measures the radio quality of the neighboring cell using a pilot signal.

Meanwhile, when the URLLC data addressed to the terminal device 200 occurs in the base station device 100 during the gap section, the URLLC controller 312 of the cell controller 310 corresponding to the connecting cell determines whether the radio quality of the neighboring cell is a predetermined transmission threshold or more. That is, it is determined whether the initial radio quality or the radio quality in the previous gap section in the neighboring cell is a predetermined transmission threshold or more. Here, the description will continue assuming that the past radio quality of the neighboring cell corresponding to the cell controller 320 is a predetermined transmission threshold or more.

In a case where the past radio quality of the neighboring cell is a predetermined transmission threshold or more, it is judged that the URLLC data can be transmitted in the neighboring cell, and the URLLC data is transferred to the cell controller 320 corresponding to the neighboring cell (step S307). This URLLC data passes through the URLLC controller 323, the coder/decoder 321, and the modulator/demodulator 322 within the cell controller 320, and the radio transmitter/receiver 140b, so as to be transmitted to the terminal device 200 (step S308). That is, the URLLC data occurring during the gap section is transmitted in the frequency band of the neighboring cell, rather than in the frequency band of the connecting cell. Therefore, the terminal device 200 that has switched the communication frequency during the gap section can receive the URLLC data, making it possible to minimize the UR LLC data latency.

When the URLLC data transmitted via the neighboring cell is received by the terminal device 200, ACK or NACK is transmitted as a URLLC data reception acknowledgment response, via the neighboring cell (step S309). That is, as a result of the decoding by the coder/decoder 222 of the terminal device 200, ACK is transmitted when the URLLC data is normally decoded, while NACK is transmitted when the URLLC data needs to be retransmitted. The ACM or NACK is transferred from the cell controller 320 to the cell controller 310 (step S310).

Thereafter, at the end time of the gap section, the frequency switching controller 224 of the terminal device 200 switches the communication frequency to the frequency band of the connecting cell. This enables radio communication via the connecting cell, and a measurement report regarding the radio quality of the neighboring cells measured during the gap section is transmitted to the base station device 100 via the connecting cell (step S311). The measurement report on the radio quality of a neighboring cell is used as a basis of judgment as to whether to perform handover of the terminal device 200 to the neighboring cell.

As described above, according to the present embodiment, in a case where the radio quality of the connecting cell is degraded, the gap section is set and the radio quality of the neighboring cells is measured by the terminal device. At the same time, the URLLC data occurring during the gap section is transmitted to the terminal device via the neighboring cells. Therefore, even when the terminal device has switched the communication frequency during the gap section, the URLLC data can be received by the terminal device, and the URLLC data can be transmitted without waiting for the end of the gap section. In other words, it is possible to suppress the data transmission latency even with the setting of the gap section during which the terminal device switches the communication frequency.

[c] Third Embodiment

A third embodiment is characterized in that URLLC data is transferred between a plurality of carriers used for communication by one base station device.

Figure 11:
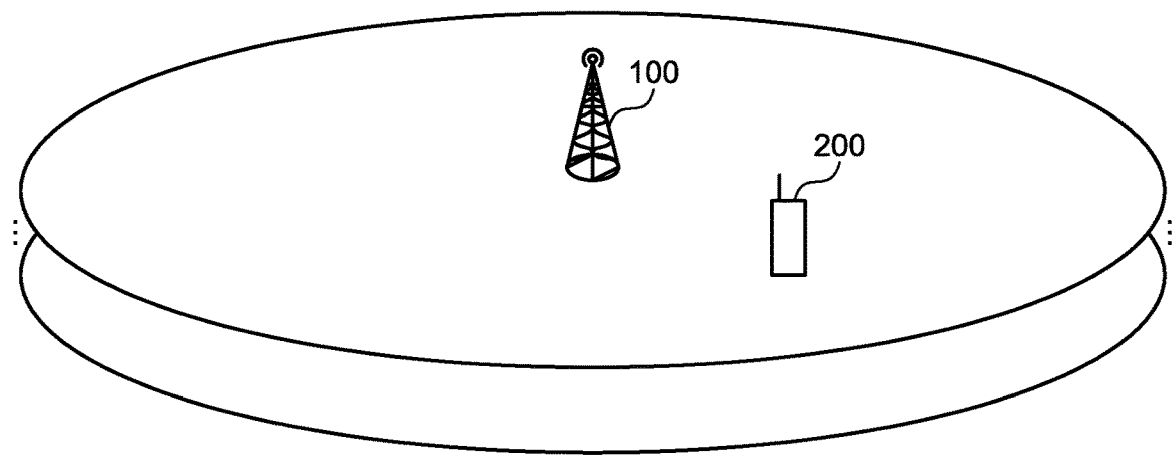
FIG. 11 is a diagram illustrating a configuration of a radio communication system according to a third embodiment.

FIG. 11 is a diagram illustrating a configuration of a radio communication system according to the third embodiment. As illustrated in FIG. 11, the base station device 100 is simultaneously transmitting and receiving a plurality of carriers having different frequencies, and the terminal device 200 uses any one of the carriers to perform radio communication with the base station device 100. Hereinafter, a carrier used by the terminal device 200 to connect to the base station device 100 is referred to as a "connection carrier", and a carrier having a frequency different from that of the connection carrier is referred to as "different carrier".

The base station device 100 monitors communication traffic using a connection carrier and a different carrier, sets a gap section for the terminal device 200 to measure the radio quality of the different carrier in a case where the resources of the connection carrier are insufficient, and transmits an instruction to measure the radio quality of the different carrier to the terminal device 200.

Upon receiving the measurement instruction from the base station device 100, the terminal device 200 switches, during the gap section, the communication frequency to the instructed frequency of the different carrier and measures the radio quality of the different carrier. At this time, for example, there is conceivable case where URLLC data has occurred in the base station device 100. Since the terminal device 200 has switched the communication frequency to the frequency of the different carrier, the URLLC data transmitted from the base station device 100 using the connection carrier would not be received by the terminal device 200. Therefore, the base station device 100 transmits the URLLC data that has occurred during the gap section to the terminal device 200 by the different carrier. This enables the base station device 100 to transmit the URLLC data that demands low latency to the terminal device 200 without waiting until the end of the gap section.

Figure 12:
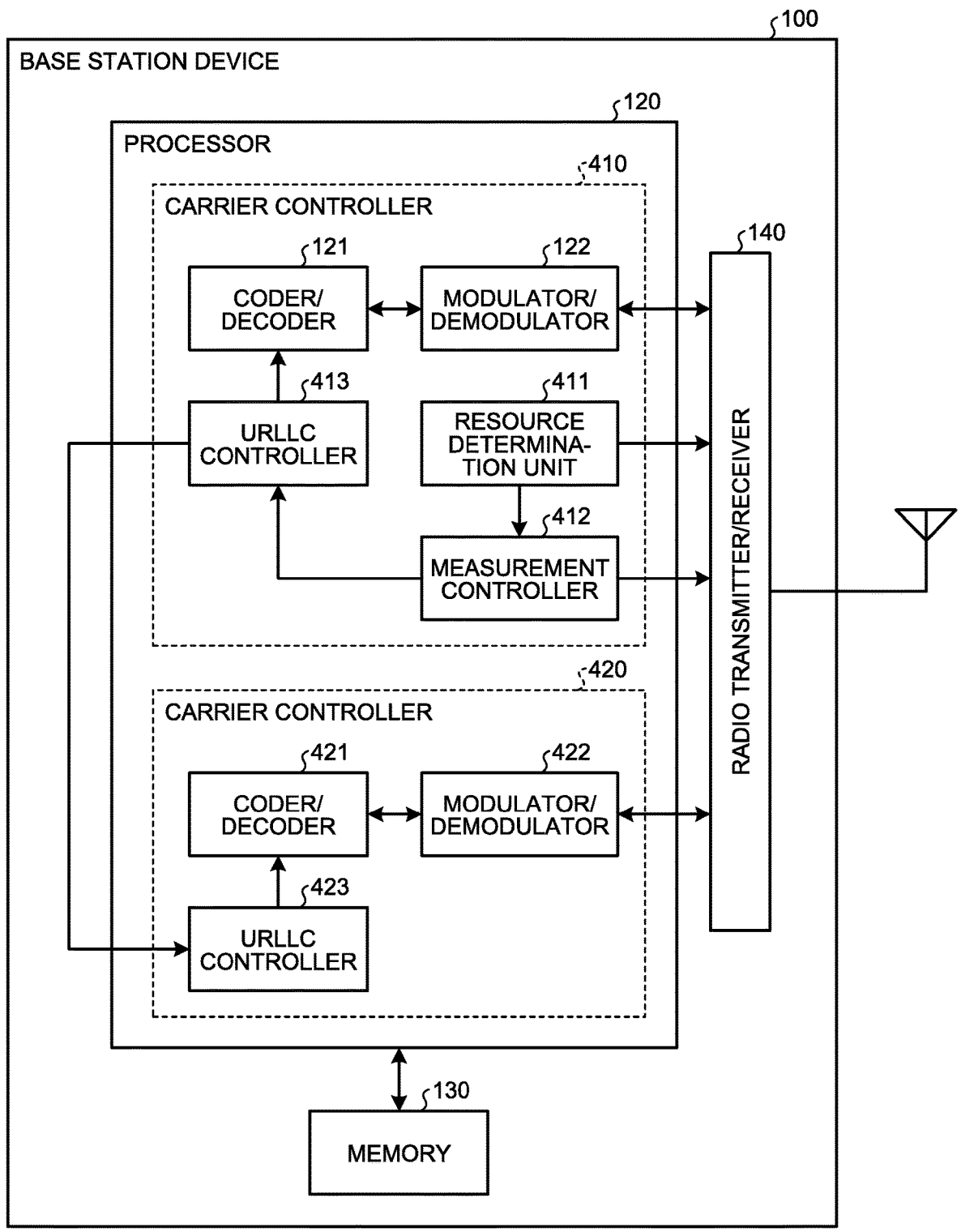
FIG. 12 is a block diagram illustrating a configuration of a base station device according to the third embodiment.

FIG. 12 is a block diagram illustrating a configuration of the base station device 100 according to the third embodiment. In FIG. 12, the same components as those in FIG. 2 are designated by the same reference numerals, and the description thereof will be omitted. The base station device 100 illustrated in FIG. 12 includes carrier controllers 410 and 420 corresponding to the connection carrier and the different carrier respectively in the processor 120 of the base station device 100 illustrated in FIG. 2.

The carrier controller 410 corresponds to the connection carrier and controls communication using the connection carrier for radio communication with the terminal device 200. Specifically, the carrier controller 410 includes a coder decoder 121, a modulator/demodulator 122, a resource determination unit 411, a measurement controller 412 and a URLLC controller 413.

The resource determination unit 411 monitors the status of traffic that uses the connection carrier in the radio transmitter/receiver 140 and determines whether the resource of the connection carrier is insufficient. That is the resource determination unit 411 determines whether the resource of the connection carrier has been used for a predetermined, threshold or more, and in a case where the resource has been used for the predetermined threshold or more, the resource determination unit 411 notifies the measurement controller 412 to that effect.

When notified from the resource determination unit 411 that the resource usage of the connection carrier has increased to a predetermined threshold or more, the measurement controller 412 sets a gap section and instructs the terminal device 200 to measure the radio quality of the different carrier. That is, in a case where the resource of the connection carrier is insufficient, the measurement controller 412 generates a measurement instruction including information for specifying the gap section together with information of the frequency of the different carrier as a measurement target and transmits the generated instruction to the terminal device 200 via the radio transmitter/receiver 140. At this time, the measurement controller 412 may generate the measurement instruction with the different carrier having the best radio quality measured during the gap section up to the previous time among the plurality of different carriers, as the measurement target. The measurement controller 412 also outputs the information included in the measurement instruction to the URLLC controller 413. An example of the information for specifying the gap section is information of the start time and the end time of the gap section.

The URLLC controller 413 controls the transmission/reception of URLLC data. Specifically, in a case where the URLLC data to be transmitted has occurred by acquiring the URLLC data addressed to the terminal device 200 from a core network, for example, the URLLC controller 413 outputs the URLLC data to the coder/decoder 121. Furthermore, in a case of occurrence of URLLC data to be transmitted during the gap section, the URLLC controller 413 determines whether the radio quality in the previous gap section of the different carrier as a measurement target is a predetermined transmission threshold or more. Subsequently, in a case where the radio quality in the previous gap section of the different carrier is the predetermined transmission threshold or more, the URLLC controller 413 transfers the URLLC data to the carrier controller 420 corresponding to this different carrier.

The carrier controller 420 corresponds to the different carrier and controls communication using the different carrier that is different from the connection carrier. Specifically, the carrier controller 420 includes a coder/decoder 421, a modulator/demodulator 422, and a URLLC controller 423.

The coder/decoder 421 executes coding of transmission data and decoding of reception data. Specifically, the coder/decoder 421 encodes the URLLC data output from the URLLC controller 423 during the gap section, for example. The coder/decoder 421 also decodes the reception data output from the modulator/demodulator 422.

The modulator/demodulator 422 executes modulation of transmission data and demodulation of reception data. Specifically, the modulator/demodulator 422 modulates the transmission data encoded by the coder/decoder 421, and outputs the modulated transmission data to radio transmitter/receiver 140. Furthermore, the modulator/demodulator 422 demodulates the reception data output from the radio transmitter/receiver 140 and outputs the demodulated data to the coder/decoder 421.

The URLLC controller 423 controls the transmission/reception of URLLC data. Specifically, the URLLC controller 423 acquires the URLLC data transferred from the carrier controller 410 corresponding to the connection carrier during the gap section and outputs the acquired URLLC data to the coder/decoder 421.

The configuration of the terminal device 200 according to the third embodiment is similar to the terminal device 200 (FIG. 4) of the first embodiment, and thus, description will be omitted.

Figure 13:
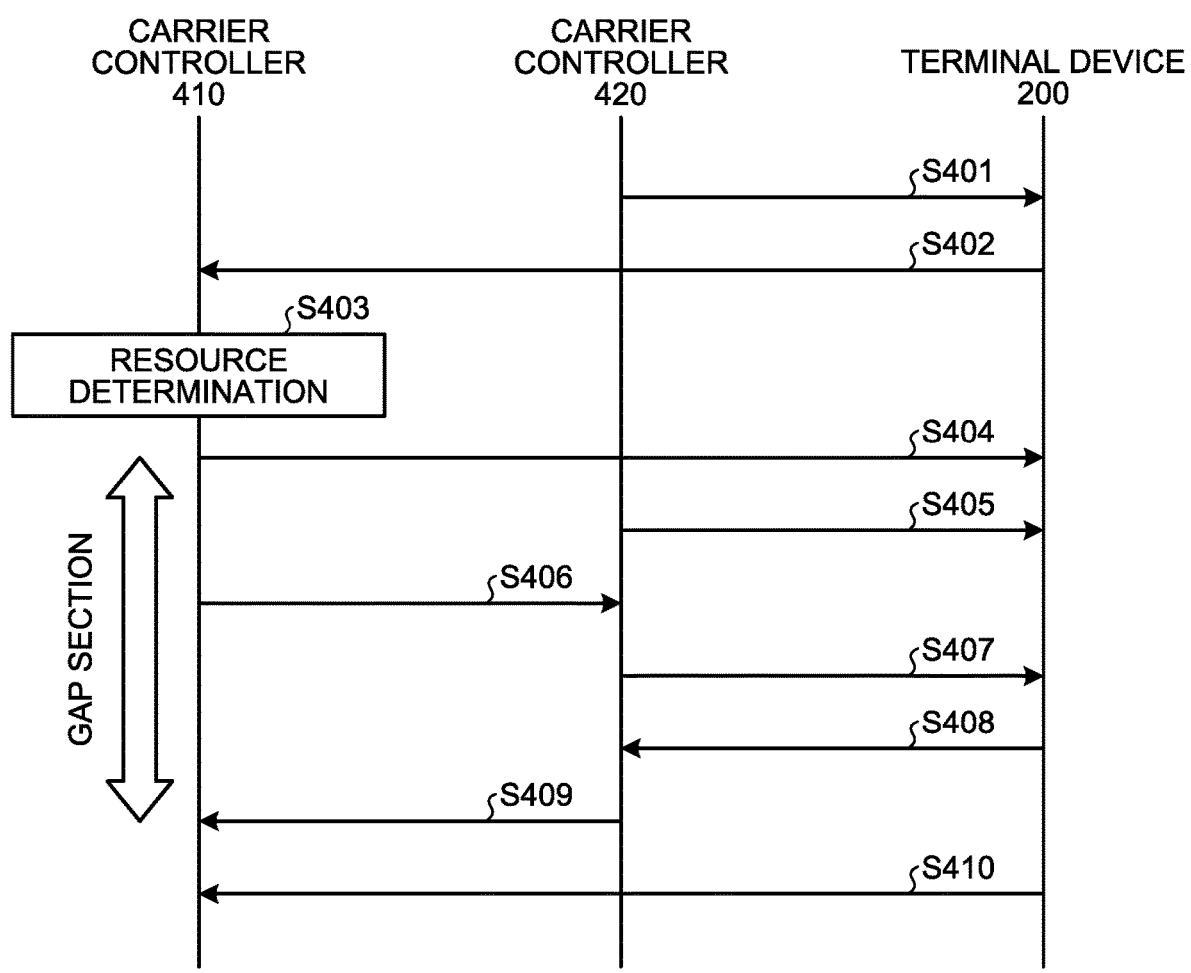
FIG. 13 is a sequence diagram illustrating a URLLC data transmission process according to the third embodiment.

Next, the URLLC data transmission process in the radio communication system configured as described above will be described with reference to the sequence diagram illustrated in FIG. 13. In the following, it is assumed that terminal device 200 is performing communication using a connection carrier controlled by the carrier controller 410, while communication using a different carrier that is different from the connection carrier is controlled by the carrier controller 420.

When the terminal device 200 connects to the base station device 100 using the connection carrier, the base station device 100 is notified from the core network, for example, that the terminal device 200 is a terminal device that is to receive the URLLC service. Upon receiving this notification, the carrier controller 410 that controls the connection carrier sets a gap section in order to collect the initial radio quality of the different carrier. Subsequently, the terminal device 200 receives, during the gap section, a pilot signal transmitted using the different carrier corresponding to the carrier controller 420 (step S401), and measures the radio quality of the different carrier. The radio quality information regarding the different carrier is transmitted using the connection carrier after the end of the gap section (step S402), and the initial radio quality information of the different carrier is stored in the memory 130.

Thereafter, radio communication between the base station device 100 and the terminal device 200 is executed using the connection carrier, and the resource, determination unit 411 of the carrier controller 410 monitors the resource of the connection carrier in the radio transmitter/receiver 140. That is, it is determined whether the resource usage of the connection carrier is a predetermined threshold or more, that is, it is determined whether the resource of the connection carrier is insufficient (step S403). When the resource of the connection carrier is not insufficient, the radio communication using the connection carrier would be continued. However here, the description will continue assuming that the resource usage of the connection carrier is a predetermined threshold or more.

In a case where the resource usage of the connection carrier is a predetermined threshold or more, the measurement controller 412 determines a different carrier with the best initial radio quality as a different carrier as a measurement target and generates a measurement instruction that instructs measurement of the radio quality of the determined different carrier as a measurement target to be performed during the gap section. Here, it is assumed that the radio quality of the different carrier corresponding to carrier controller 420 is the best and that this different carrier is determined as the measurement target. The measurement instruction includes frequency information of the different carrier as the measurement target and also includes the information that specifies the gap section such as the start time and the end time. The generated measurement instruction is transmitted to the terminal device 200 using the connection carrier (step S404).

When the measurement instruction is received by the terminal device 200, the measurement instruction is acquired by the measurement instruction acquisition unit 223 or the terminal device 200, and then the frequency switching controller 224 switches the communication frequency during the gap section to the frequency of the different carrier as a measurement target. Therefore, during the gap section, the terminal device 200 does not receive the signal transmitted using the connection carrier but receives the signal transmitted using the different carrier. Therefore, the terminal device 200 receives a pilot signal transmitted using the different carrier (step S405), and the radio quality measurement unit 225 of the terminal device 200 measures the radio quality of the different carrier using the pilot signal.

Meanwhile, when the URLLC data addressed to the terminal device 200 occurs in the base station device 100 during the gap section, the URLLC controller 413 of the carrier controller 410 corresponding to the connection carrier determines whether the radio quality of the different carrier is a predetermined transmission threshold or more. That is, it is determined whether the initial radio quality of the different carrier or the radio quality in the previous gap section is a predetermined transmission threshold or more. Here, the description will continue assuming that the past radio quality of the different carrier corresponding to the carrier controller 420 is a predetermined transmission threshold or more.

In a case where the past radio quality of the different carrier is a predetermined transmission threshold or more, it is judged that the URLLC data can be transmitted using the different carrier, and the URLLC data is transferred to the carrier controller 420 corresponding to the different carrier (step S406). This URLLC data passes through the URLLC controller 423, the coder/decoder 421, and the modulator/demodulator 422 within the carrier controller 420, and the radio transmitter/receiver 140, so as to be transmitted to the terminal device 200 (step S407). That is, the URLLC data that has occurred during the gap section is transmitted by the different carrier, rather than the connection carrier. Therefore, the terminal device 200 that has switched the communication frequency during the gap section can receive the URLLC data, making possible to minimize the URLLC data latency.

When the URLLC data transmitted using the different carrier is received by the terminal device 200, ACK or NACK is transmitted as a URLLC data reception acknowledgment response by using the different carrier (step S408). That is, as a result of the decoding by the coder/decoder 222 of the terminal device 200, ACK is transmitted when the URLLC data is normally decoded, while NACK is transmitted when the URLLC data needs to be retransmitted. The ACK or NACK is transferred from the carrier controller 420 to the carrier controller 410 (step S409).

Thereafter, at the end time of the gap section, the frequency switching controller 224 of the terminal device 200 switches the communication frequency to the frequency of the connection carrier. This enables radio communication using the connection carrier, and a measurement report regarding the radio quality of the different carrier measured during the gap section is transmitted to the base station device 100 using the connection carrier (step S410). The measurement report regarding the radio quality of the different carrier is used to judge whether to perform radio communication between the base station device 100 and the terminal device 200 using the different carrier.

As described above, according to the present embodiment, in a case where the resource of the connection carrier is insufficient, the gap section is set, and the radio quality of the different carrier is measured by the terminal device. At the same time, the URLLC data occurring during the gap section is transmitted to the terminal device by using the different carrier. Therefore, even when the terminal device has switched the communication frequency during the gap section, the URLLC data can be received by the terminal device, and the URLLC data can be transmitted without waiting for the end of the gap section. In other words, it is possible to suppress the data transmission latency even with the setting of the gap section during which the terminal device switches the communication frequency.

[d] Fourth Embodiment

The fourth embodiment is characterized in that a neighboring cell formed by a neighboring base station closest to the terminal device is selected as a measurement target based on a positional relationship between the neighboring base station and the terminal device.

Figure 14:
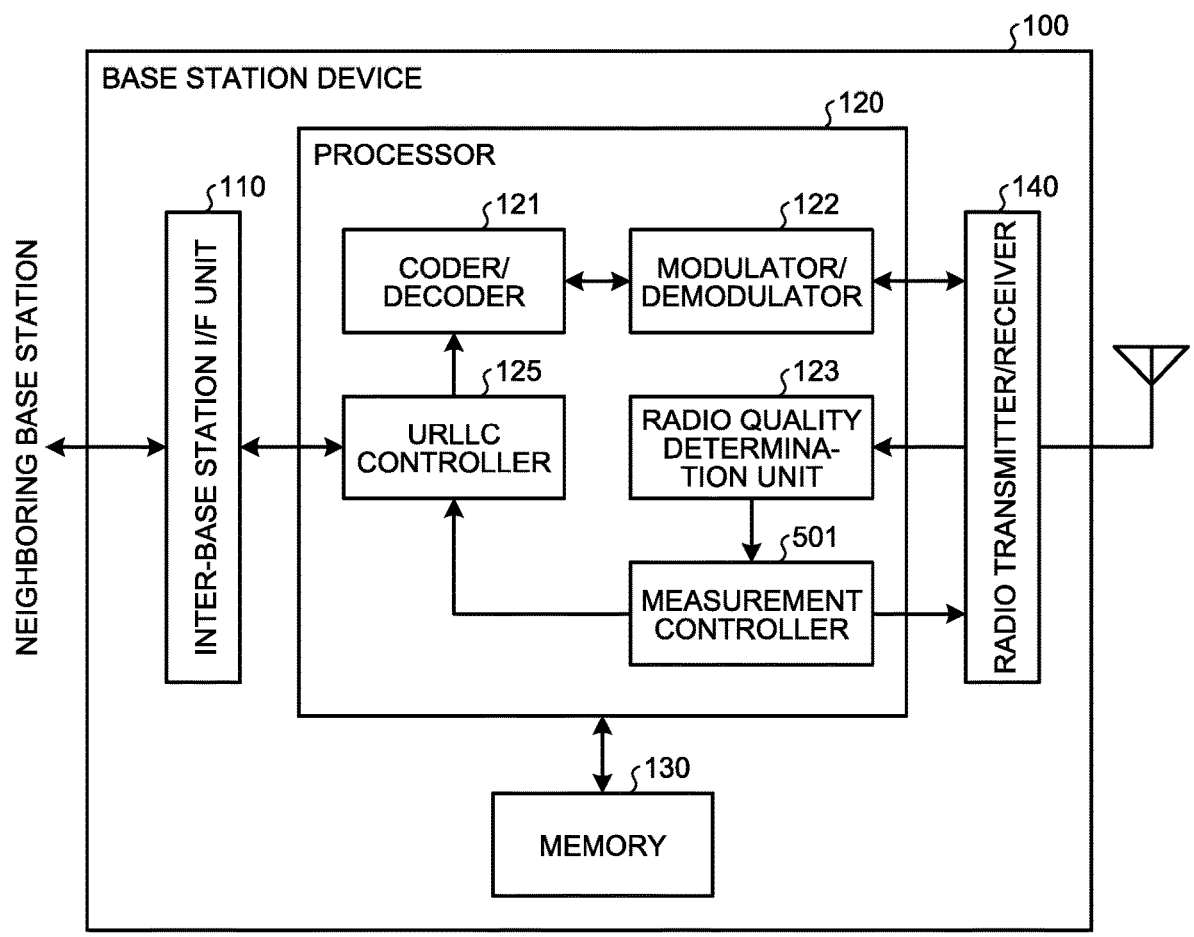
FIG. 14 is a block diagram illustrating a configuration of a base station device according to a fourth embodiment.

The configuration of a radio communication system according to the fourth embodiment is similar to the configuration of the first embodiment (FIG. 1), and thus, description will be omitted. In the fourth embodiment, the configuration of the base station device 100 differs from the case in the first embodiment. FIG. 14 is a block diagram illustrating a configuration of the base station device 100 according to the fourth embodiment. In FIG. 14, the same components as those in FIG. 2 are designated the same reference numerals, and the description thereof will be omitted. The base station device 100 illustrated in FIG. 14 includes a measurement controller 501 instead of the measurement controller 124 of the base station device 100 illustrated in FIG. 2.

In a case where it is notified from the radio quality determination unit 123 that the radio quality of the connecting cell has fallen below a predetermined measurement threshold, the measurement controller 501 sets a gap section and instructs the terminal device 200 to measure the radio quality of neighboring cells. That is, in a case where the radio quality of the connecting cell is degraded, the measurement controller 501 generates a measurement instruction including information for specifying a gap section together with identification information of the neighboring base station as a measurement target and the frequency band information of the neighboring cells and transmits the instruction to the terminal device 200 via the radio transmitter/receiver 140. At this time, the measurement controller 501 estimates the current position of the terminal device 200 and specifies a neighboring base station closest to the current position of the terminal device 200 based on the preliminarily stored position of the neighboring base station and the current position of the terminal device 200. Subsequently, the measurement controller 501 generates a measurement instruction with the neighboring cell formed by the specified neighboring base station, as a measurement target. The measurement controller 501 also outputs the information included in the measurement instruction to the URLLC controller 125. Note that the measurement controller 501 may estimate the current position of the terminal device 200 based on information regarding received power of a signal from the terminal device 200 or regarding timing advance (TA), for example, or may estimate the current position based on a positioning result obtained by the terminal device 200 using the Global Positioning System (GPS).

The configuration of the terminal device 200 according to the fourth embodiment is similar to the terminal device 200 (FIG. 4) of the first embodiment, and thus, description will be omitted.

Figure 15:
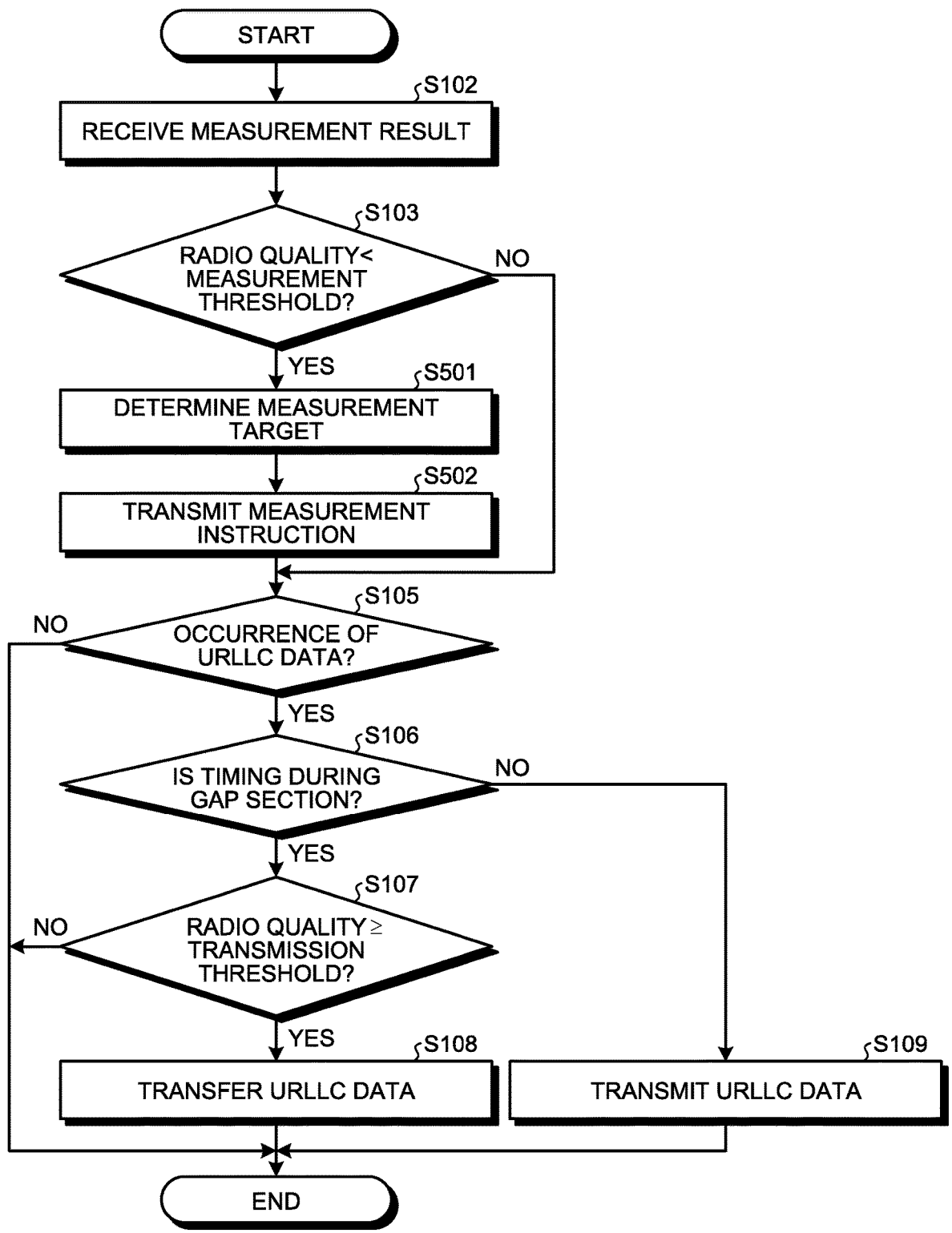
FIG. 15 is a flowchart illustrating operation of the base station device according to the fourth embodiment.

Next, operation of base station device 100 configured as above will be described with reference to the flowchart illustrated in FIG. 15. In the following, the operation in a case where the base station device 100 is a connecting base station will be described. In FIG. 15, the same components as those in FIG. 3 are designated by the same reference numerals.

In a case where the base station device 100 is a connecting base station for the terminal device 200, the base station device 100 is notified from the core network that the terminal device 200 is a terminal device that is, to receive the URLLC service. In the present embodiment, even when the terminal device 200 has received the URLLC service notification, the base station device 100 omits the initial collection of radio quality in neighboring cells. That is, the base station device 100 starts radio communication with the terminal device 200 without setting a gap section at the start of the service.

Subsequently, when the radio communication between the base station device 100 and the terminal device 200 is started, the terminal device 200 periodically measures the radio quality of the connecting cell, and transmits a measurement report including the measurement result of the radio quality of the connecting cell. The measurement report is received by the radio transmitter/receiver 140 of the base station device 100 (step S102) and is acquired by the radio quality determination unit 123. Subsequently, the radio quality determination unit 123 compares the radio quality of the connecting cell with a predetermined measurement threshold (step S103). In a case where the radio quality is less than the predetermined measurement threshold (Yes in step S103), the measurement controller 501 will be notified of the comparison result.

Upon receiving this notification, the measurement controller 501 determines a neighboring cell as a measurement target (step S501). That is, the measurement controller 501 estimates the current position of the terminal device 200, and selects a neighboring base station closest to the current position of the terminal device 200 from among the plurality of neighboring base stations. The neighboring cell formed by the selected neighboring base station is determined as the neighboring cell as a measurement target. Typically, a shorter distance between the neighboring base station and the terminal device 200 leads to a small propagation loss and good radio quality. Accordingly, a neighboring cell formed by the neighboring base station closest to the current position of the terminal device 200 is likely to be a neighboring cell with good radio quality. For this reason, it is possible to select a neighboring cell that is likely tip have good radio quality as a measurement target even with no collection of the initial radio quality.

Subsequently the measurement controller 501 generates a measurement instruction including the identification information of the neighboring base station forming the neighboring cell as the measurement target, the frequency band information regarding the neighboring cell, and including the information specifying the gap section such as the start time and the end time. The generated measurement instruction is transmitted to the terminal device 200 via the radio transmitter/receiver 140 (step S502). The information included in the measurement instruction is also output to the URLLC controller 125.

When these processes are executed, the URLLC controller 125 also monitors whether URLLC data has occurred (step S105). When the URLLC data has not occurred (No in step S105), the process related to the URLLC data transmission will end. In contrast, when the URLLC data has occurred (Yes in step S105), the URLLC controller 125 refers to the information output from the measurement controller 501 to judge whether the timing is during the gap section (step S106). When the timing is not during the gap section (No in step S106), the URLLC data that has occurred is output to the coder/decoder 121, encoded by the coder/decoder 121, modulated by the modulator/demodulator 122. The URLLC data thereafter undergoes radio transmission process by the radio transmitter/receiver 140 and then is transmitted to the terminal device 200 via an antenna (step S109). In this manner, in a case where the occurrence timing of the URLLC data is not during the gap section, the URLLC data will be immediately transmitted from the base station device 100 with no latency.

In contrast, in a case where the URLLC data occurs during the gap section (Yes in Step S106), the URLLC controller 125 refers to the radio quality information regarding the neighboring cells, and determination is made as to whether the past radio quality of the neighboring cell as a measurement target during the gap section is a predetermined transmission threshold or more (step S107). In a case where the radio quality of the neighboring cell is less than the predetermined transmission threshold as a result of this determination (No in step S107), it is considered that transmission of the URLLC data would be difficult in the neighboring cell, and thus, the URLLC data will be discarded or transmitted after the end of the gap section.

In a case where the radio quality of the neighboring cell is a predetermined transmission threshold or more (Yes in step S107), it is considered that transmission of the URLLC data in the neighboring cell is possible, and thus, the URLLC data will be transferred by the URLLC controller 125 to the neighboring base station via the inter-base station I/F unit 110 (step S108). The transferred URLLC data is input to the URLLC controller 125 of the neighboring base station, and passes through the coder/decoder 121, the modulator/demodulator 122, and the radio transmitter/receiver 140 so as to be transmitted to the terminal device 200 via an antenna. Here, since the terminal device 200 switches the communication frequency to the frequency band of the neighboring cell in measuring the radio quality, the URLLC data transmitted from the neighboring base station is received by the terminal device 200. In this manner, in a case where the occurrence timing of the URLLC data is during the gap section, the URLLC data is transferred to the neighboring base station and immediately transmitted from the neighboring base station. Therefore, even when the terminal device 200 has switched the communication frequency during the gap section, it is possible to suppress data transmission latency.

As described above, according to the present embodiment, in a case where the radio quality of the connecting cell is degraded, the gap section is set and the radio quality of the neighboring cells is measured by the terminal device. At the same time, the URLLC data occurring during the gap section is transmitted to the terminal device via the neighboring cells. Therefore, even when the terminal device has switched the communication frequency during the gap section, the URLLC data can be received by the terminal device, and the URLLC data can be transmitted without waiting for the end of the gap section. In other words, it is possible to suppress the data transmission latency even with the setting of the gap section during which the terminal device switches the communication frequency. Moreover, since the neighboring cell as a measurement target, during the gap section is determined based on the positional relationship between the current position of the terminal device and the neighboring base stations, there is no need to collect the initial radio quality of each of neighboring cells.

Note that the above described embodiments may be appropriately combined and executed. Furthermore, in each of the embodiments, the ACK or MACK for the URLLC data transmitted during the gap section may be transmitted using the connecting cell or the connection carrier after the end of the gap section. Furthermore, it is allowable to repeatedly transmit the URLLC data by using a neighboring cell or a different carrier during the gap section so as to improve the redundancy so as to omit transmission of ACK and MACK.

Furthermore, while each of the above embodiments is a case where the URLLC data is used as an example of data whose latency needs to meet a certain criterion, the data transferred during the gap section need not necessarily be the URLLC data.

According to one aspect of the base station device, the terminal device, the radio communication system, and the data transmission method disclosed in the present application, it is possible to suppress latency in data transmission.

All examples and conditional language recited herein are intended for pedagogical purposes of aiding the reader in understanding the invention and the concerts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio base station that controls radio communication with a radio terminal using a first radio frequency, the radio base station comprising:
a controller that controls a period in which communication in the connecting cell at the first radio frequency is interrupted and the radio terminal switches the communication frequency to a second radio frequency different from the first radio frequency and measures a radio quality of the second radio frequency;
a transmitter that transmits a control signal including information regarding the second radio frequency and the period to the radio terminal; and
a transfer processor that transfers data addressed to the radio terminal in a case where the data occurs during the period.

2. The radio base station according to claim 1, wherein the transmitter transmits, during the period, the control signal further including information regarding the radio terminal and/or information regarding latency in communication with the radio terminal.

3. The radio base station according to claim 1, further comprising:
a determination processor that acquires a measurement result of radio quality of the first radio frequency from the radio terminal and determines whether the radio quality of the first radio frequency is less than a predetermined measurement threshold,
wherein the controller sets the period when the determination processor determines that the radio quality of the first radio frequency is less than the predetermined measurement threshold.

4. The radio base station according to claim 1, further comprising:
a determination processor that determines whether resource usage of the first radio frequency is equal to or more than a predetermined threshold,
wherein the controller sets the period when the determination processor determines that the resource usage of the first radio frequency is equal to or more than the predetermined threshold.

5. The radio base station according to claim 1, wherein the transmitter determines a radio frequency having a best past radio quality and being different from the first radio frequency as the second radio frequency and transmits information for instructing the radio terminal to switch a communication frequency to the second radio frequency and measure radio quality of the communication frequency.

6. The radio base station according to claim 1, wherein the controller estimates a current position of the radio terminal and determines a radio frequency being used for radio communication at a position closest to the current position of the radio terminal and being different from the first radio frequency as the second radio frequency, and
the transmitter transmits information for instructing the radio terminal to switch a communication frequency to the second radio frequency and measure radio quality of the communication frequency.

7. The radio base station according to claim 1, wherein the controller is further configured to determine whether past radio quality of the second radio frequency is equal to or more than a predetermined transmission threshold and transfers the data when the past radio quality of the second radio frequency is equal to or more than the predetermined transmission threshold.

8. The radio base station according to claim 1, further comprising:
a communication controller that controls radio communication using the second radio frequency,
wherein the controller is further configured to transfer the data addressed to the radio terminal to the communication controller.

9. The radio base station according to claim 1, further comprising a receiver that receives reception acknowledgement information for the data, from the radio terminal.

10. The radio base station according to claim 1, wherein the transfer processor transfers the data addressed to the radio terminal to a different radio base station that controls radio communication with the radio terminal using the second radio frequency.

11. A radio base station that controls radio communication with a radio terminal using a first radio frequency, the radio base station comprising:
a receiver that receives control information regarding a period in which the radio terminal interrupts communication using the first radio frequency, switches the communication frequency to a second radio frequency different from the first radio frequency and measures a radio quality of the second radio frequency; and
a transmitter that transmits data to the radio terminal when the receiver receives, during the period, information regarding occurrence of the data or information regarding transfer of the data and the data.

12. The radio base station according to claim 11, wherein the receiver receives, during the period, the control information further including information regarding the radio terminal and/or information regarding latency in communication.

13. A radio terminal that performs radio communication with a radio base station using a first radio frequency, the radio terminal comprising:
a measurement processor capable of measuring radio quality of a second radio frequency different from the first radio frequency, during a period instructed by the radio base station; and
a receiver that receives data transmitted using the second radio frequency, during the period in which communication in the connecting cell at the first radio frequency is interrupted and the radio terminal switches the communication frequency to a second radio frequency and measures a radio quality of the second radio frequency.

14. A radio communication system comprising:
a radio base station and
a radio terminal that performs radio communication using a first radio frequency, wherein the radio base station includes:
a transmitter that transmits to the radio terminal a control signal including information regarding a period in which the radio terminal interrupts communication using the first radio frequency, switches the communication frequency to a second radio frequency and measures a radio quality of the second radio frequency different from the first radio frequency and information regarding the second radio frequency; and a transfer processor that transfers data in a case where the data occurs during the period, and the radio terminal includes:

a measurement processor that measures the radio quality of the second radio frequency during the period; and a receiver that receives the data transmitted using the second radio frequency, during the period.

15. A data transmission method executed by a radio base station that controls radio communication with a radio terminal using a first radio frequency, the method comprising:

transmitting, to the radio terminal, a control signal including information regarding a period in which communication in the connecting cell at the first radio frequency is interrupted and the radio terminal switches the communication frequency to a second radio frequency different from the first radio frequency and measures a radio quality of the second radio frequency, and information regarding the second radio frequency; and transferring data in a case where the data occurs during the period.

* * * * *